US012028617B2

(12) United States Patent
Yang et al.

(10) Patent No.: US 12,028,617 B2
(45) Date of Patent: Jul. 2, 2024

(54) DISPLAY APPARATUS AND PROCESSING METHOD FOR DISPLAY APPARATUS WITH CAMERA

(71) Applicant: HISENSE VISUAL TECHNOLOGY CO., LTD., Shandong (CN)

(72) Inventors: Luming Yang, Shandong (CN); Dayong Wang, Shandong (CN); Xusheng Wang, Shandong (CN); Jin Cheng, Shandong (CN); Wenqin Yu, Shandong (CN); Le Ma, Shandong (CN); Jiayi Ding, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 56 days.

(21) Appl. No.: 18/060,210

(22) Filed: Nov. 30, 2022

(65) Prior Publication Data
US 2023/0090916 A1 Mar. 23, 2023

Related U.S. Application Data

(63) Continuation of application No. PCT/CN2021/093588, filed on May 13, 2021.

(30) Foreign Application Priority Data

Jul. 1, 2020 (CN) .......................... 202010621070.4
Aug. 21, 2020 (CN) .......................... 202010848905.X
Jan. 6, 2021 (CN) .......................... 202110014128.3

(51) Int. Cl.
*G10L 17/06* (2013.01)
*G06T 7/70* (2017.01)
(Continued)

(52) U.S. Cl.
CPC ............. *H04N 23/695* (2023.01); *G06T 7/70* (2017.01); *G10L 17/02* (2013.01); *G10L 17/06* (2013.01);
(Continued)

(58) Field of Classification Search
CPC ....................................................... G10L 17/06
See application file for complete search history.

(56) References Cited

U.S. PATENT DOCUMENTS

2007/0195012 A1 8/2007 Ichikawa et al.

FOREIGN PATENT DOCUMENTS

CN 102186051 A 9/2011
CN 104767970 A 7/2015
(Continued)

OTHER PUBLICATIONS

International Search Report, mailed Aug. 2, 2021, from PCT/CN2021/093588.

*Primary Examiner* — Young Lee
(74) *Attorney, Agent, or Firm* — Workman Nydegger

(57) ABSTRACT

Disclosed are a display apparatus and a processing method for the display apparatus with a camera. The display apparatus includes a camera, a sound collector and controller. The controller is configured for: starting shooting at least one image through the camera; in response to the at least one image not including a portrait of a user, starting obtaining a first test audio signal input from the user through the sound collector; in response to the first test audio signal, determining a target azimuth corresponding to the user; generating a rotation instruction for the camera according to the target azimuth of the user; sending the rotation instruction to the camera to adjust a shooting direction of the camera to the target azimuth.

20 Claims, 19 Drawing Sheets

(51) Int. Cl.
*G10L 17/02* (2013.01)
*G10L 17/22* (2013.01)
*H04N 21/422* (2011.01)
*H04N 21/431* (2011.01)
*H04N 23/611* (2023.01)
*H04N 23/695* (2023.01)
*H04R 1/02* (2006.01)
*H04R 1/40* (2006.01)
*H04R 3/00* (2006.01)

(52) U.S. Cl.
CPC ............ *G10L 17/22* (2013.01); *H04N 21/422* (2013.01); *H04N 21/431* (2013.01); *H04N 23/611* (2023.01); *H04R 1/028* (2013.01); *H04R 1/406* (2013.01); *H04R 3/005* (2013.01); *G06T 2207/30196* (2013.01); *H04R 2499/15* (2013.01)

(56) References Cited

FOREIGN PATENT DOCUMENTS

| | | | |
|---|---|---|---|
| CN | 105049709 | A | 11/2015 |
| CN | 105278380 | A | 1/2016 |
| CN | 106292732 | A | 1/2017 |
| CN | 108668077 | A | 10/2018 |
| CN | 110460772 | A | 11/2019 |
| CN | 111432115 | A | 7/2020 |
| CN | 111708383 | A | 9/2020 |

(a) Horizontal=0 degree (b) Horizontal=60 degrees (c) Horizontal=120 degrees

DISPLAY APPARATUS AND PROCESSING METHOD FOR DISPLAY APPARATUS WITH CAMERA

CROSS REFERENCE TO RELATED APPLICATIONS

The present application is a continuation application of International Application No. PCT/CN2021/093588, filed on May 13, 2021, which claims the priorities of the Chinese patent application No. 202010848905.X filed on Aug. 21, 2020, the Chinese patent application No. 202010621070.4 filed on Jul. 1, 2020, and the Chinese patent application No. 202110014128.3 filed on Jan. 6, 2021. The entire contents of these applications are incorporated herein by reference.

FIELD

The present application relates to television software, in particular to a display apparatus and a processing method for the display apparatus with a camera.

BACKGROUND

With rapid development of a display apparatus, the display apparatus is equipped with a growing number of functions, and more and more powerful in performance. For example, the display apparatus may realize network search, IP TV, BBTV Netviom, video on demand (VOD), digital music, network news, network video call and other functions. When utilizing the display apparatus to realize network video calling, it is necessary to include a camera in the display apparatus to collect user images.

SUMMARY

A display apparatus is provided. The display apparatus includes: a display, configured for presenting one or more images and one or more user interfaces, wherein the one or more images include images obtained from broadcast system or network; an interface component, connected with a camera and a sound collector, wherein the camera is configured for capturing images and able to rotate a shooting angle, and the sound collector includes a microphone array including a plurality of microphones and is configured for collecting one or more audio signals; and a controller, connected with the display and the interface component, and configured for: starting shooting at least one image through the camera; in response to the at least one image not including a portrait of a user, starting obtaining a first test audio signal input from the user through the sound collector; in response to the first test audio signal, determining a target azimuth corresponding to the user, wherein the target azimuth is calculated according to a time difference of the test audio signal by obtaining at least two test audio signals collected by at least two microphones among the microphone array; generating a rotation instruction for the camera according to the target azimuth of the user; sending the rotation instruction to the camera to adjust a shooting direction of the camera to the target azimuth; and controlling the camera to shoot one or more reference images until a reference image includes a portrait pattern of the user, stopping obtaining a subsequent test audio signal input following the first test audio signal from the user, and generating a tracking instruction according to a position of the portrait pattern in the reference image, wherein the position of the portrait pattern in the reference image is determined according to a skeleton line graph created based on one or more identified key points of the portrait of the user.

A processing method for a display apparatus with a camera is provided. The method includes: starting shooting at least one image through the camera; in response to the at least one image not including a portrait of a user, starting obtaining a first test audio signal input from the user through a sound collector of the display apparatus, wherein the sound collector includes a microphone array including a plurality of microphones; in response to the first test audio signal, determining a target azimuth corresponding to the user, wherein the target azimuth is calculated according to a time difference of the test audio signal by obtaining at least two test audio signals collected by at least two microphones among a microphone array of the sound collector of the display apparatus; generating a rotation instruction for the camera according to the target azimuth of the user; sending the rotation instruction to the camera to adjust a shooting direction of the camera to the target azimuth; and controlling the camera to shoot one or more reference images until a reference image includes a portrait pattern of the user, stopping obtaining a subsequent test audio signal input following the first test audio signal from the user, and generating a tracking instruction according to a position of the portrait pattern in the reference image, wherein the position of the portrait pattern in the reference image is determined according to a skeleton line graph created based on one or more identified key points of the portrait of the user.

DETAILED DESCRIPTION OF THE EMBODIMENTS

In order to make the objective, implementations and advantages of the present application more clear, the exemplary implementations of the present application will be described below clearly and completely with reference to the drawings in the exemplary embodiments of the present application. Obviously, the described exemplary embodiments are only some, but not all the embodiments.

On the basis of the exemplary embodiments described in the present application, all other embodiments obtained by those ordinarily skilled in the art without inventive efforts fall within the protection scope of the claims appended to the present application. In addition, although disclosed contents in the present application are discussed in terms of one or several exemplary instances, it should be understood that each aspect of these disclosed contents may also constitute a complete implementation individually.

It should be noted that the brief description of the terms in the present application is only for conveniently understanding the following described implementations, and is not intended to limit the implementation of the present application. Unless otherwise noted, these terms should be understood according to their plain and ordinary meanings.

The term "remote control" used in the present application refers to a component of an electronic device (such as a display apparatus disclosed in the present application). The component may usually and wirelessly control the electronic device in a short distance range. The component is generally connected with the electronic device by using an infrared and/or radio frequency (RF) signal and/or Bluetooth, and may also include functional modules such as WiFi, wireless USB, Bluetooth and a motion sensor. For example, a handheld touch remote control is to replace most physical built-in hard keys in a general remote control device with a user interface on a touch screen.

Figure 1:
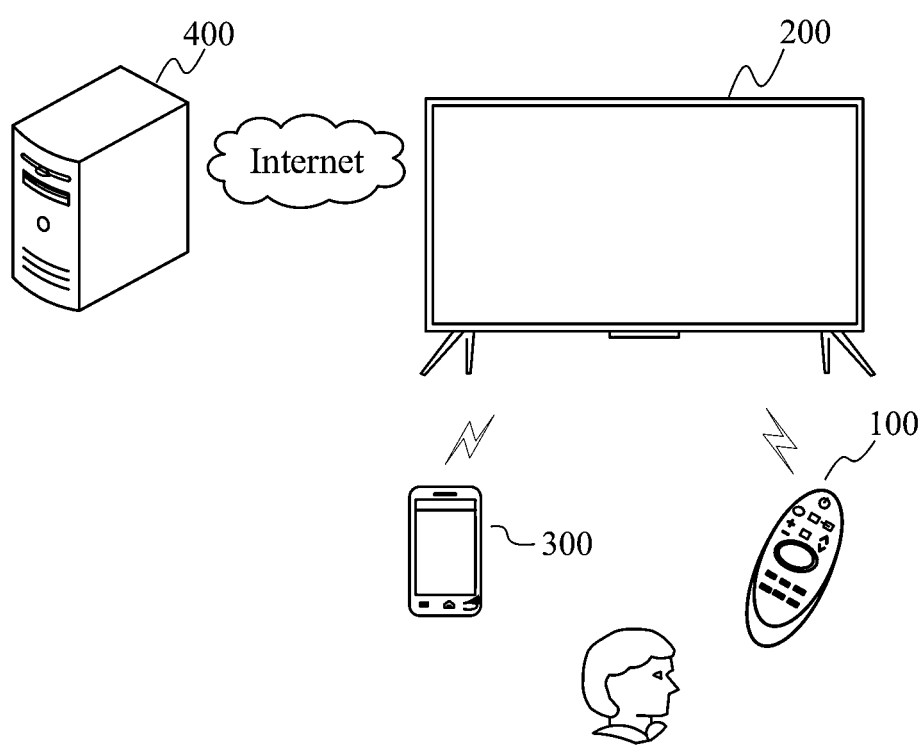
FIG. 1 shows a schematic diagram of an operating scenario between a display apparatus and a control device according to some embodiments of the present application.

FIG. 1 shows a schematic diagram of an operating scenario between a display apparatus and a control device according to some embodiments of the present application. As shown in FIG. 1, a user may operate the display apparatus 200 through a smart device 300 or the control device 100.

The control device 100 may be a remote control. Communication of the remote control and the display apparatus includes at least one of infrared protocol communication, Bluetooth protocol communication, or other short-distance communication modes. The remote control controls the display apparatus 200 in a wireless or wired manner. The user may control the display apparatus 200 by inputting user commands through keys on the remote control, voice input, control panel input, and the like.

In some embodiments, the display apparatus 200 may also be controlled by a smart device 300 (such as a mobile terminal, a tablet computer, a computer and a notebook computer, etc.). For example, the display apparatus 200 is controlled using an application running on the smart device.

In some embodiments, the display apparatus 200 may further be controlled by other modes except for the control device 100 and the smart device 300. For example, voice command control may be directly received through a module for obtaining a voice command from a user and configured in the display apparatus 200, or the voice command control of the user may also be received through a voice control device disposed outside the display apparatus 200.

In some embodiments, the display apparatus 200 is further in data communication with the server 400. The display apparatus 200 may be in communication through a local area network (LAN), a wireless local area network (WLAN) and other networks. The server 400 may provide various contents and interactions for the display apparatus 200.

Figure 2:
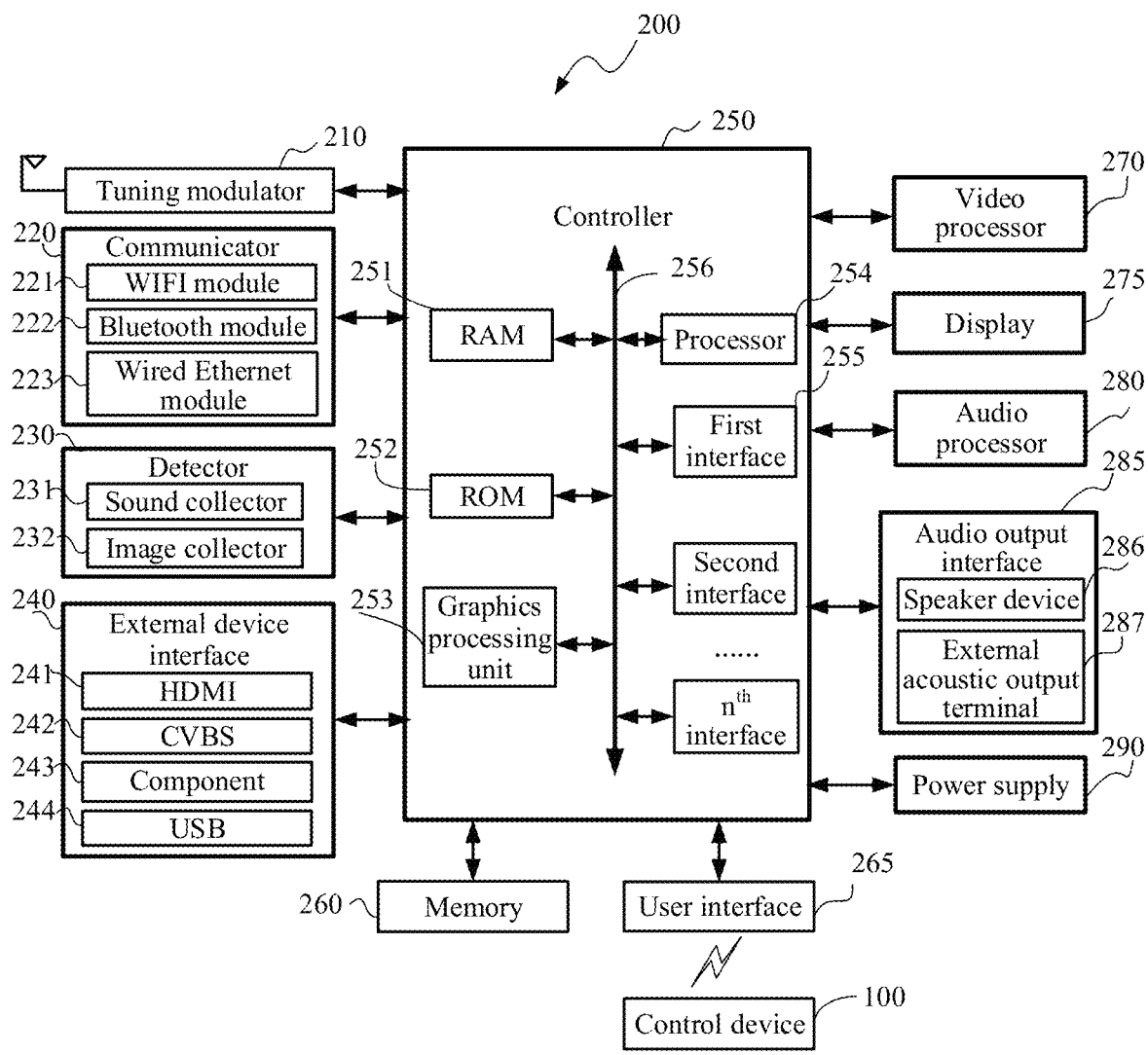
FIG. 2 shows a block diagram of hardware configuration of a display apparatus 200 according to some embodiments of the present application.
Figure 3:
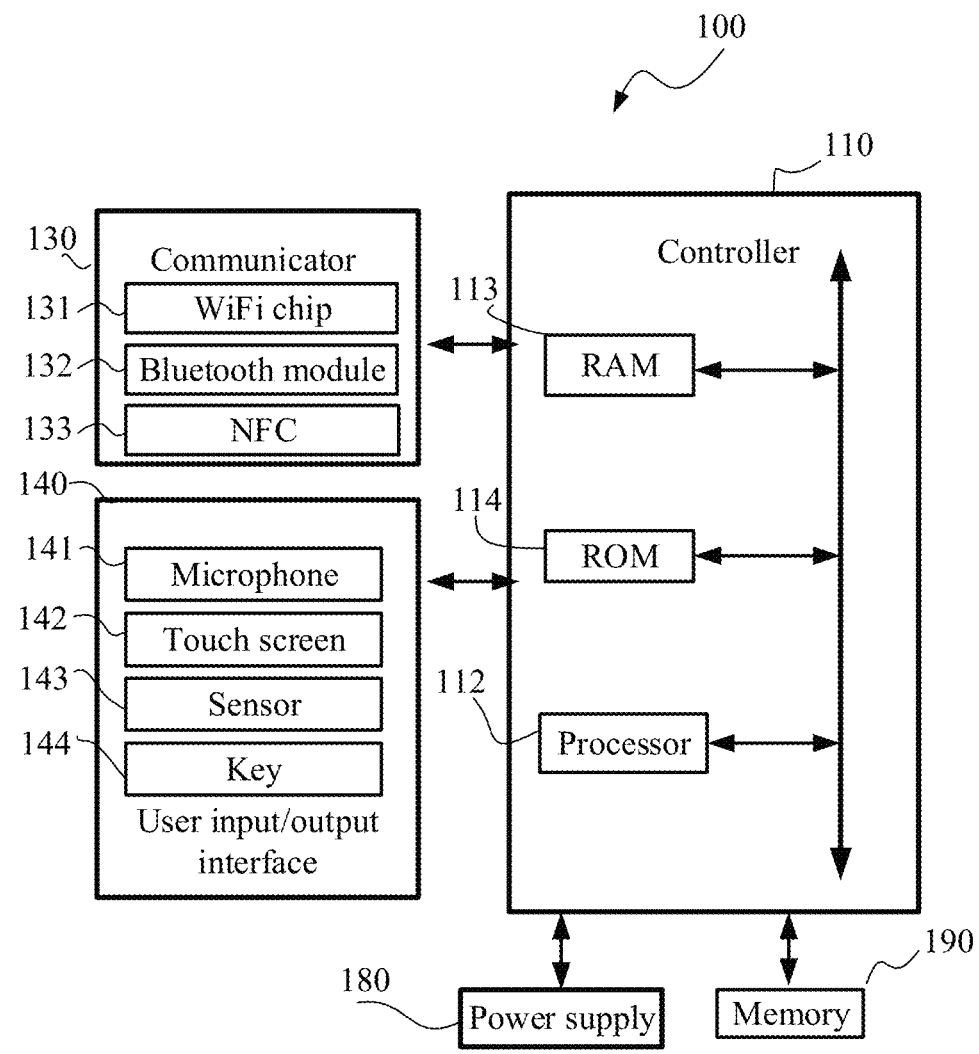
FIG. 3 shows a block diagram of hardware configuration of a control device 100 according to some embodiments of the present application.

FIG. 2 shows a configuration block diagram of the control device 100 according to some embodiments of the present application. As shown in FIG. 3, the control device 100 includes a controller 110, a communicator 130, a user input/output interface 140, a memory 190 and a power supply 180. The control device 100 may receive an operation command input from the user, convert the operation command into an instruction capable of being identified and responded by the display apparatus 200, and play an interaction intermediary role between the user and the display apparatus 200.

FIG. 2 shows a block diagram of hardware configuration of the display apparatus 200 according to some embodiments of the present application.

The display apparatus 200 includes at least one of a tuning demodulator 210, a communicator 220, a detector 230, an external device interface 240, a controller 250, a display 275, an audio output interface 285, a memory 260, a power supply 290, or a user interface 265.

The display 275 includes a panel component for presenting images, a driving component for driving image display, components for receiving image signals output from the controller and displaying video contents, image contents and a menu manipulation interface, and a user manipulation UI.

The display 275 may be a liquid crystal display, an OLED display, or a projection display, and may also be a projection apparatus and a projection screen.

The communicator 220 is a component configured to communicate with an external device or a server according to various communication protocols. For example, the communicator 220 may include at least one of a Wifi module 221, a Bluetooth module 222, a wired Ethernet module 223 and other network communication protocol chips or near-field communication protocol chips, or an infrared receiver. The display apparatus 200 may establish sending and receiving of a control signal and a data signal with the external control device 100 or the server 400 through the communicator 220.

The user interface may be configured to receive a control signal from the control device 100 (such as an infrared remote control).

The detector 230 is configured to collect an external environment or a signal interacting with the outside. For example, the detector 230 includes an optical receiver, which is a sensor configured to collect an ambient light intensity. Or the detector 230 includes an image collector 232, such as a camera, which may be configured to collect an external environment image, user attributes or a user interaction gesture. Or, the detector 230 includes a sound collector 231, such as a microphone, for receiving external sound.

The external device interface 240 may include but is not limited to the following: any one or more interfaces of a high definition multimedia interface (HDMI), an analog or data high-definition component input interface (component), a composite video input interface (CVBS), a USB input interface (USB), an RGB port and the like. It may also be a composite input/output interface formed by the above plurality of interfaces.

The controller 250 and the tuning modulator 210 may be located in different individual devices. That is, the tuning modulator 210 may also be in an external device of a main body device where the controller 250 is located, such as an external set top box.

The controller 250 is configured to control work of the display apparatus and respond to operations of the user through various software programs stored in the memory 260. The controller 250 is configured to control an overall operation of the display apparatus 200. For example: in response to receiving a user command for selecting a UI object shown on the display 275, the controller 250 may execute an operation relevant to the object selected by the user command.

The object may be any one of optional objects, such as a hyperlink, an icon or other operable controls. The operation relevant to the selected object includes: an operation of displaying connection to a hyperlink page, a file, an image and the like, or an operation of launching an application corresponding to the icon.

In some embodiments, the user may input a user command at a graphical user interface (GUI) shown on the display 275, and then the user input interface receives the user input command through the graphical user interface (GUI). Or, the user may input the user command by inputting a specific sound or gesture, and then the user input interface identifies the sound or gesture through a sensor so as to receive the user input command.

Figure 4:
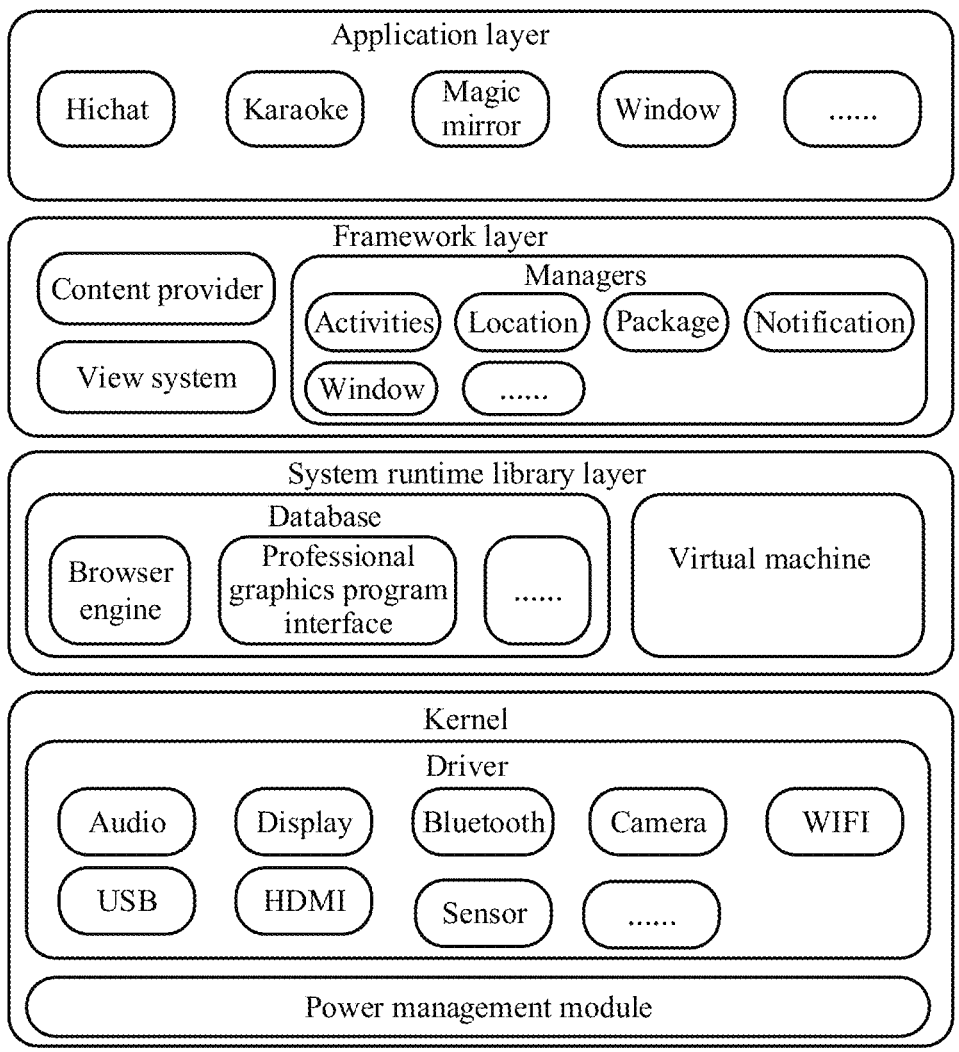
FIG. 4 shows a schematic diagram of software configuration in a display apparatus 200 according to some embodiments of the present application.

Referring to FIG. 4, in some embodiments, the system is divided into four layers, from top to bottom, namely, an application layer, an application framework layer, an Android runtime and system library layer, and a kernel layer respectively.

In some embodiments, at least one application is running in the application layer, and these applications may be built-in applications, such as a window application, a system setting application, a clock application, a camera application, and may also be applications developed by a third-party developer, such as a Hichat application, a karaoke application, and a magic mirror application. During specific implementations, an application package in the application layer is not limited to the above examples, but may actually include other application packages, which is not limited in the embodiments of the present application.

The framework layer provides an application programming interface (API) and a programming framework for the applications in the application layer. The application framework layer includes some predefined functions. The application framework layer is equivalent to a processing center in some sense, and the center makes decisions on how the applications in the application layer take action. The application may access resources in the system and obtain the services of the system during execution through the API.

As shown in FIG. 4, the application framework layer in the embodiments of the present application includes managers, a content provider and the like, wherein the managers include at least one of the following: an activity manager for interacting with all activities running in the system, a location manager for providing access to a system location service for a system service or application, a package manager for retrieving various information relevant to the application packages currently installed on the device, a notification manager for controlling the display and removal of a notification message, or a window manager for managing an icon, a window, a toolbar, wallpaper, and a desktop widget on the user interface.

In some embodiments, the activity manager is configured to: manage a life cycle of each application and common navigation back functions, such as exiting from an application (including switching an user interface currently shown the display window to a system desktop), launching, and back (including switching an user interface currently shown in the display window to a previous level of user interface) of the application.

In some embodiments, the system runtime library layer provides support for the upper layer, namely the framework layer. When the framework layer is configured, the Android operating system will run a C/C++library contained in the system runtime library layer to realize the functions of the framework layer.

In some embodiments, the kernel layer is a layer between hardware and software. As shown in FIG. 4, the kernel layer at least contains at least one of the following drivers: an audio driver, a display driver, a Bluetooth driver, a camera driver, a WIFI driver, a USB driver, an HDMI driver, a sensor driver (such as a fingerprint sensor, a temperature sensor, a touch sensor and a pressure sensor), and the like.

In some embodiments, the kernel layer further includes a power driving module for power management.

In some embodiments, software applications and/or modules corresponding to a software architecture in FIG. 4 are stored in a first memory or a second memory shown in FIG. 2 or FIG. 3.

In some embodiments, taking the magic mirror application (a camera application) as an example, when a remote control receiving device receives a remote control input operation, the corresponding hardware interrupt is sent to the kernel layer. The kernel layer processes the input operation into an original input event (including a value of the input operation, a timestamp of the input operation, and other information). The original input event is stored in the kernel layer. The application framework layer obtains the original input event from the kernel layer, identifies a control corresponding to the input event according to a current position of a focus point and takes the input operation as a confirmation operation. The control corresponding to the confirmation operation is a control of the magic mirror application icon. The magic mirror application calls an interface of the application framework layer to start the magic mirror application, and then starts the camera driver by calling the kernel layer, thereby capturing still images or videos through the camera.

In some embodiments, for the display apparatus with a touch control function, taking a split screen operation as an example, the display apparatus receives an input operation (such as a split screen operation) that the user acts on the display screen, and the kernel layer may generate a corresponding input event according to the input operation and report the event to the application framework layer. The activity manager of the application framework layer sets the window mode (such as a multi-window mode) corresponding to the input operation, a window position and size and the like. The window manager of the application framework layer draws the window according to the settings of the activity manager, and then sends the data of the drawn window to the display driver of the kernel layer. The display driver shows the corresponding application interfaces in different display areas of the display screen.

Figure 5:
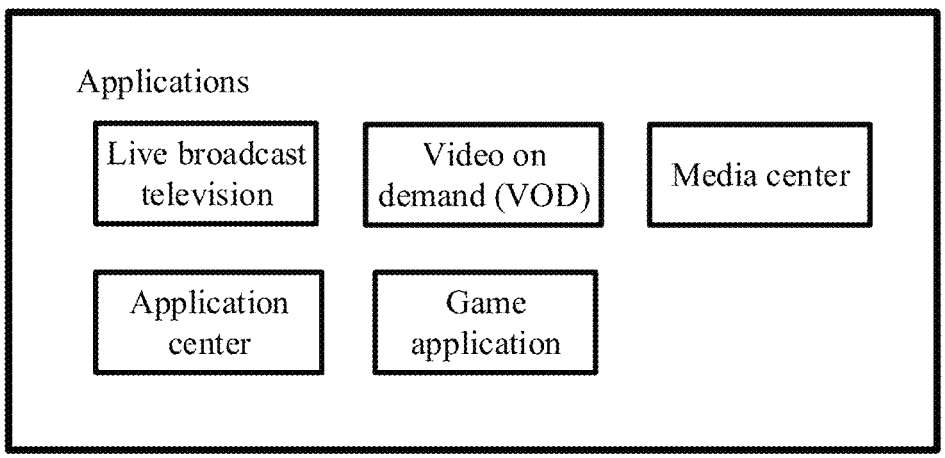
FIG. 5 shows a schematic diagram of an icon control interface of an application in a display apparatus 200 according to some embodiments of the present application.

In some embodiments, as shown in FIG. 5, the application layer includes at least one icon which can be presented on the display, such as: an icon for live broadcast television application, an icon for video on demand application, an icon for media center application, an icon for an application center, and an icon for a game application.

In some embodiments, a live broadcast television application may provide live broadcast television through different signal sources. For example, the live broadcast television application may provide a television signal input from cable television, wireless broadcasting, a satellite service, or other types of live broadcast television services. The live broadcast television application may display a video of the live broadcast television signal on the display apparatus 200.

In some embodiments, the video on demand application may provide videos from different storage sources. Unlike the live broadcast television application, video on demand provides video display from some storage sources. For example, the video on demand may come from a server side of cloud storage and from a local hard disk memory containing saved video programs.

In some embodiments, the media center application may provide various applications for multimedia content playing. For example, a media center may be different from the live broadcast television or the video on demand, and the user may access various services provided by images or audio through the media center application.

In some embodiments, the application center may provide storage of various applications. The applications may include a game application or some other applications related to a computer system or other devices but capable of being run in a smart television. The application center may obtain these applications from different sources, store them in a local memory, and then run them on the display apparatus 200.

In some embodiments, the camera in the display apparatus may be used by some Applications, such as "Hichat" (a video chat application), "mirror" (a picture taking application), "MIAO KIDS" (an education application), "Fitness" (a workout application), and the like, which may realize "video chat", "chatting while watching", "fitness" and other functions. "Hichat" is a video chat application, which may realize one-key chat between a mobile phone and a television, and between the televisions. "mirror" application is an application that provides the user with a mirror service. By turning on the camera through the application of mirror, the user may use the smart television as a mirror. "MIAO KIDS" is an application that provides a learning function. When realizing the "chatting while watching" function, the user watches a video program at the same time when starting the "Hichat" application for a video call. The "fitness" function may synchronously display a fitness guidance video and an image of the user following the fitness guidance video to do the corresponding motion taken by the camera on the screen of the display apparatus, so that the user may check whether user's own motions are standard in real time.

Since the user may not stay at a fixed position when using the display apparatus for "video chat", "chatting while watching" or "fitness", the user may further realize the above functions while walking. However, in related display apparatus, the camera is fixedly mounted in the display apparatus. A viewing angle centerline of the camera is perpendicular to the screen, and a visual angle of the camera is limited, usually between 60° and 75°. That is, a photographing area of the camera is an area corresponding to an angle range of 60°-75° formed by starting from the viewing angle centerline of the camera as extending towards the left and right.

If a user walks out of the photographing area of the camera, the camera will not photograph an image containing the portrait of the user, leading to no portrait being shown on the display. If in a video chat call scenario, a counterpart party who is conducting the video chat call with a local end user will not be able to see the local end user. In a fitness scenario, the display cannot display the image of the fitness motion of the user, and the user cannot see user's own fitness motion and thus will be unable to judge whether it is standard or not, which will cause negative user experience.

Figure 6:
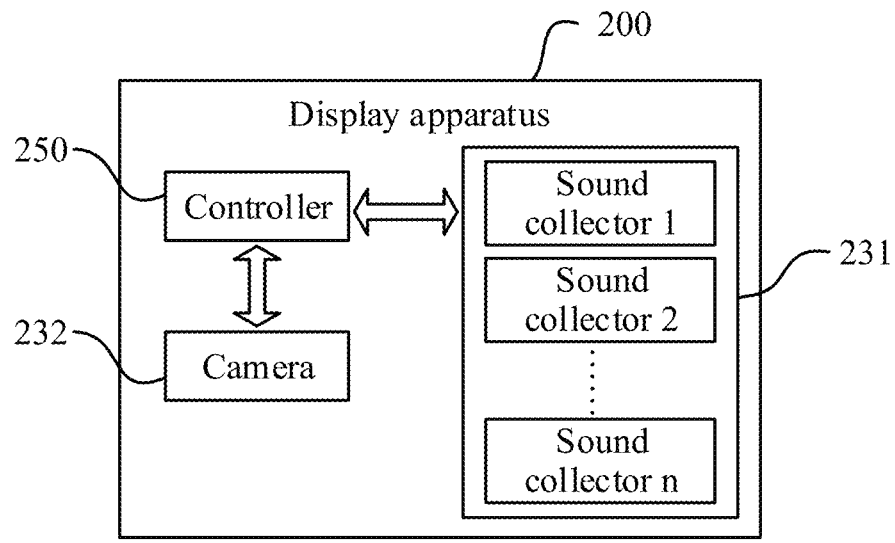
FIG. 6 shows a structural block diagram of a display apparatus according to some embodiments of the present application.

FIG. 6 shows a structural block diagram of the display apparatus according to some embodiments of the present application. To enable the camera to still photograph the image of the user even when the user walks out of the photographing area of the camera, referring to FIG. 6, an embodiment of the present application provides a display apparatus including the camera 232, a sound collector 231 and a controller 250. The camera is configured to collect an image in front of the camera. Instead of a fixed mounting mode, the camera is mounted in the display apparatus in a rotatable manner. Specifically, the camera 232 is mounted on the top of the display in a rotating form, and the camera 232 may rotate along the top of the display.

Figure 7:
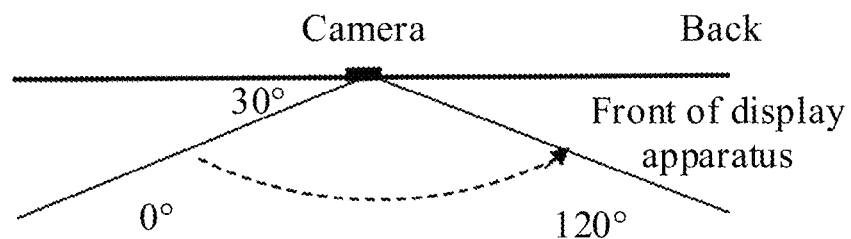
FIG. 7 shows a schematic diagram for realizing a preset angle range of camera rotation according to some embodiments of the present application.
Figure 8A:
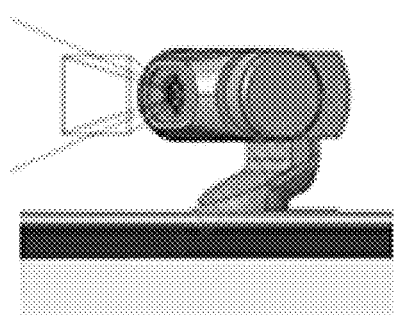
FIG. 8A shows a scenario diagram of camera rotation within a preset angle range according to some embodiments of the present application.
Figure 8B:
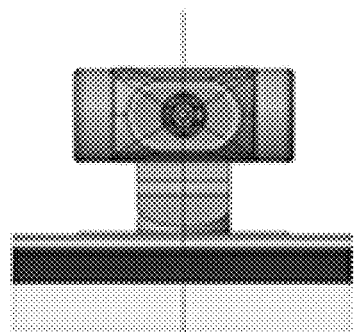
FIG. 8B shows a scenario diagram of camera rotation within a preset angle range according to some embodiments of the present application.
Figure 8C:
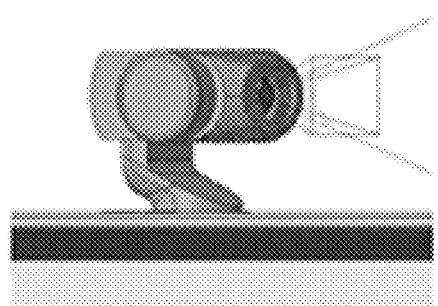
FIG. 8C shows a scenario diagram of camera rotation within a preset angle range according to some embodiments of the present application.

FIG. 7 shows a schematic diagram for realizing a preset angle range of camera rotation according to some embodiments of the present application. FIG. 8A to FIG. 8C show a scenario diagram of camera rotation within the preset angle range according to some embodiments of the present application. Referring to FIG. 7 and FIG. 8A to FIG. 8C, the preset camera 232 may rotate within the preset angle range and rotate along a horizontal direction. In some embodiments, the preset angle range is 0°-120°, that is, at a position facing the display, a left side is regarded as 0°, and a right side is regarded as 120°. A state when a viewing angle centerline of the camera 232 is perpendicular to the display is taken as an initial state, and thus the camera may rotate from the initial state to the left by 60° and rotate from the initial state to the right by 60°. A position where the viewing angle centerline of the camera is perpendicular to the display is a position of 60° of the camera.

The display apparatus according to the embodiments of the present application utilizes sound source information to trigger rotation of the camera, can automatically identify a real-time position of the user and adjust a photographing angle of the camera, so that the camera can always photograph an image containing the portrait of a target or an object. In some embodiments, the display apparatus collects sound source information of the user by the sound collector 231.

In order to ensure the accuracy of sound source collecting, the display apparatus may be provided with a plurality of sets of sound collectors. In some embodiments, the display apparatus has four sets of sound collectors 231, and the four sets of sound collectors 231 may be arranged in a linear position relationship. In some embodiments, the sound collectors may be microphones, and the four sets of microphones are linearly arranged to form a microphone array. During sound collecting, the four sets of sound collectors 231 receive sound information generated when the same user interacts with the display apparatus through voice.

Figure 9:
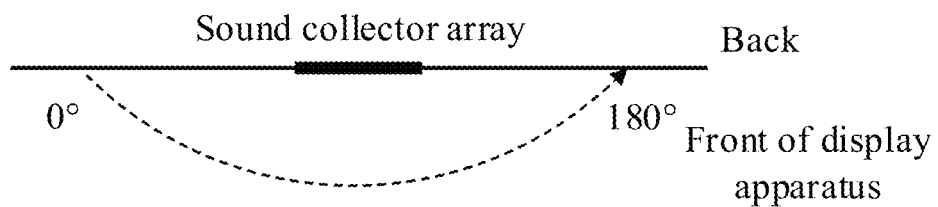
FIG. 9 shows a schematic diagram of a sound source angle range according to some embodiments of the present application.

FIG. 9 shows a schematic diagram of a sound source angle range according to some embodiments of the present application. When the user speaks, the sound from the user will be received by 360°. Therefore, when the user is located in front of the display apparatus, the sound source angle range generated by the user is 0°-180°. Similarly, when the user is located at back of the display apparatus, the sound source angle range generated by the user is also 0°-180°. Referring to FIG. 9, taking a position of the user facing the display apparatus as an example, the position of the user located on left side of the sound collector is horizontal 0°, and the position of the user located on right side of the sound collector is horizontal 180°.

Referring to FIG. 7 and FIG. 9, a position of a 30° angle of a sound source is equal to a position of a 0° angle of the camera, a position of a 90° angle of the sound source is equal to a position of a 60° angle of the camera, and a position of a 150° angle of the sound source is equal to a position of a 120° angle of the camera.

The controller 250 is respectively connected with the camera 232 and the sound collector 231. The controller is configured to receive sound source information of the user collected by the sound collector, recognize the sound source information, determine an azimuth angle of a position of the user, and then determine an angle that the camera needs to rotate. The controller adjusts a photographing angle of the camera according to the determined angle that the camera needs to rotate, so that a photographing area of the camera directly faces the position of the user when the user is speaking, and the photographing angle of the camera is adjusted according to the position of the user to photograph an image including the user.

Figure 10A:
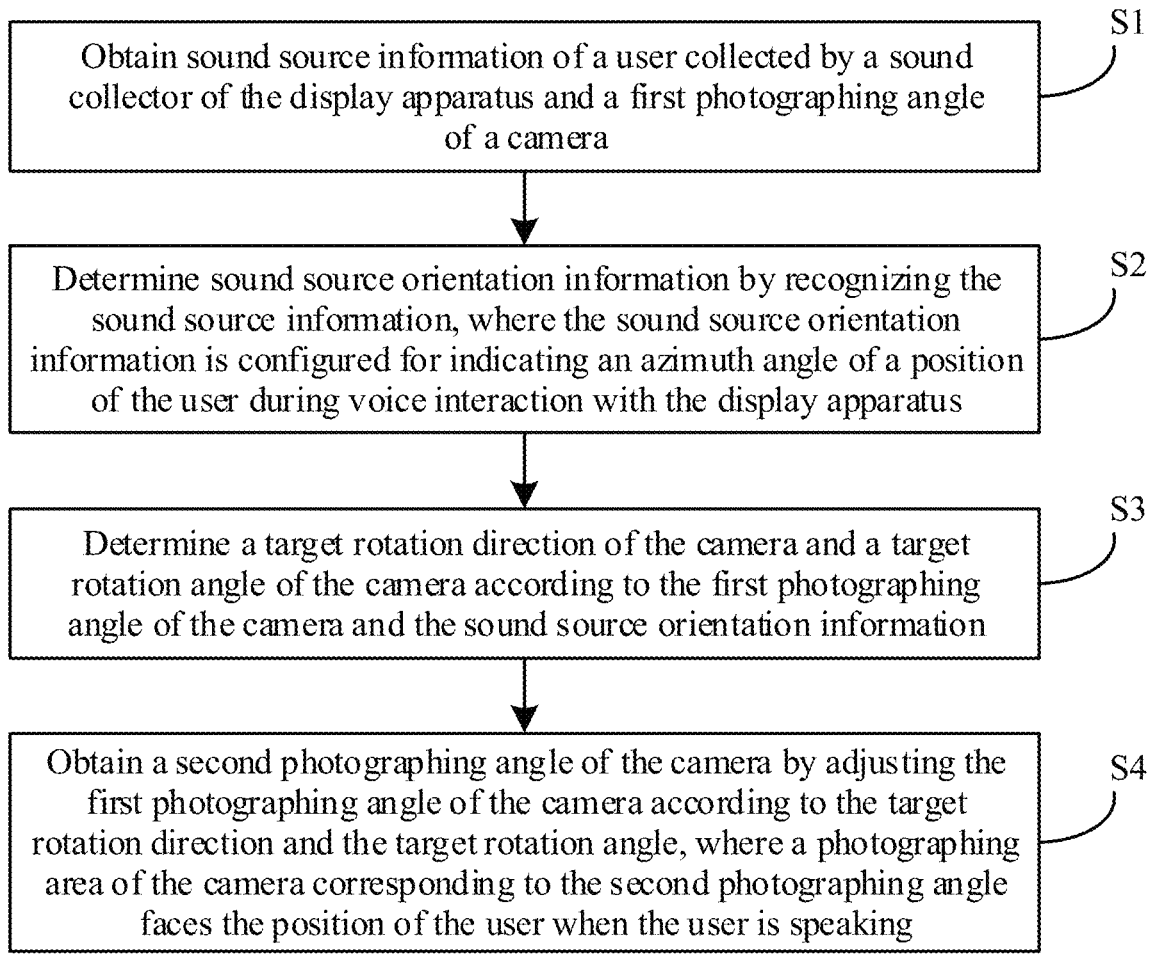
FIG. 10A shows a flow diagram of a method for adjusting a photographing angle of a camera according to some embodiments of the present application.

FIG. 10A shows a flow diagram of a method for adjusting a photographing angle of the camera according to some embodiments of the present application. An embodiment of the present application provides a display apparatus. When adjusting the photographing angle of the camera according to the position of the user, a controller is configured to execute the method for adjusting the photographing angle of the camera shown in FIG. 10A, including S1 to S4.

S1, Obtain sound source information of a user collected by a sound collector of the display apparatus and a first photographing angle of a camera. The first photographing angle is a current photographing angle of the camera.

In some embodiments, when the controller in the display apparatus drives the camera to rotate to adjust the photographing angle of the camera, it needs to be determined according to the sound source information generated during user's voice interaction with the display apparatus at a location. The sound source information refers to sound information generated when the user interacts with the display apparatus by voice.

The sound source information may determine an azimuth angle of the position of the user when the user is speaking. In order to accurately determine the angle that the camera needs to be adjusted, it is necessary to first obtain a current state of the camera, namely, the current photographing angle of the camera. The current photographing angle of the camera can only be obtained when the camera is in a stop or still state to ensure the accuracy of the current photographing angle of the camera, so as to ensure the accuracy of the angle that the camera needs to be adjusted.

Figure 10B:
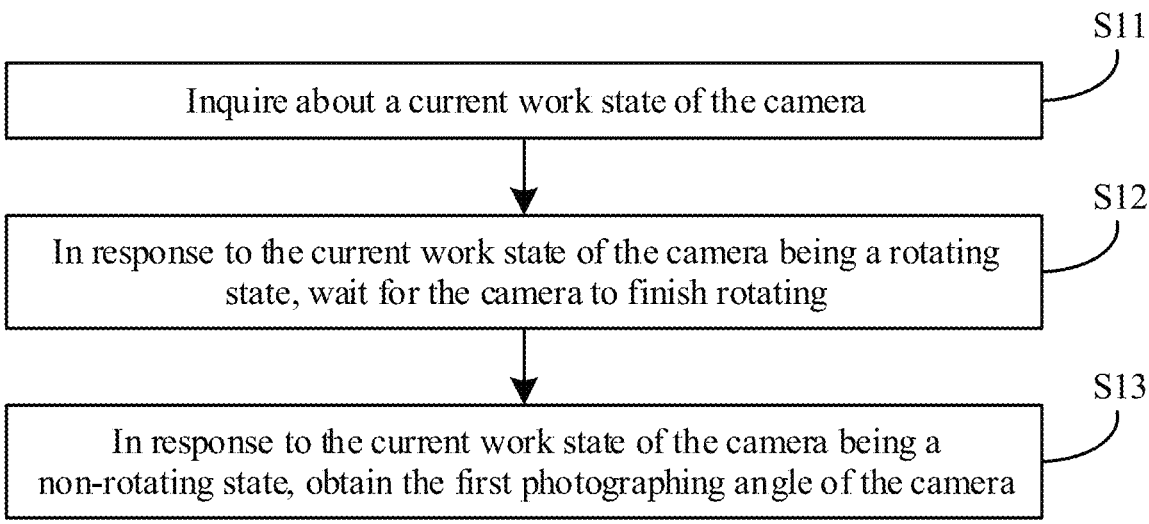
FIG. 10B shows a flow diagram of a process before obtaining the first photographing angle of the camera according to some embodiments of the present application.

Therefore, before obtaining the current photographing angle of the camera, the controller is further configured to execute the following steps as shown in FIG. 10B.

S11, Inquire about a current work state of the camera.

S12, In response to the current work state of the camera being a rotating state, wait for the camera to finish rotating.

S13, In response to the current work state of the camera being a non-rotating state, obtain the first photographing angle of the camera.

The controller is internally equipped with a motor control service. The motor control service is configured to drive the camera to rotate, and obtain the work state of the camera and a camera orientation angle.

The motor control service monitors the work state of the camera in real time. The controller inquires about the current work state of the camera by calling the motor control service. The current work state of the camera may indicate the current orientation angle of the camera and whether the camera is in the rotating state.

If the camera is in the rotating state, the current photographing angle of the camera cannot be obtained at this time, or an accurate value cannot be determined. Therefore, when the camera is in the rotating state, it is necessary to wait for the camera to execute the previous instruction to complete the rotation, and then obtaining the current photographing angle of the camera in the stop or non-rotating state.

If the camera is in the non-rotating state, that is, the camera is in the stop state, the step of obtaining the current photographing angle of the camera may be executed.

S2, Determine sound source orientation information by recognizing the sound source information, where the sound source orientation information is configured for indicating an azimuth angle of a position of the user during voice interaction with the display apparatus.

After obtaining the sound source information during user's voice interaction with the display apparatus, the controller needs to perform sound source identification on the sound source information so as to determine the position of the user during user's voice interaction, specifically the azimuth angle, that is, whether the user is located on the left side, the right side or directly facing the sound collector, and then adjust the photographing angle of the camera according to the position of the user.

During user's interaction with the display apparatus, such as in a video call scenario, the voice of the user may be communicating with another terminal, but the user is still in the photographing area of the camera. If the controller performs a step of adjusting the photographing angle of the camera in this case, an invalid operation may occur.

Therefore, in order to accurately determine whether the photographing angle of the camera needs to be adjusted according to the sound source information, it is necessary to first analyze the sound source information during user's voice interaction to determine whether the sound source information is the particular information required to trigger camera adjustment.

In some embodiments, a wakeup text for triggering adjustment of the photographing angle of the camera may be stored in the controller in advance, for example, "Hisense Xiaoju" is customized as the wakeup text for sound source identification. The user issues the voice "Hisense Xiaoju" as the identification sound source to trigger a process of adjusting the photographing angle of the camera. The wakeup text may also be other words, which are not specifically limited in the embodiments.

Figure 11:
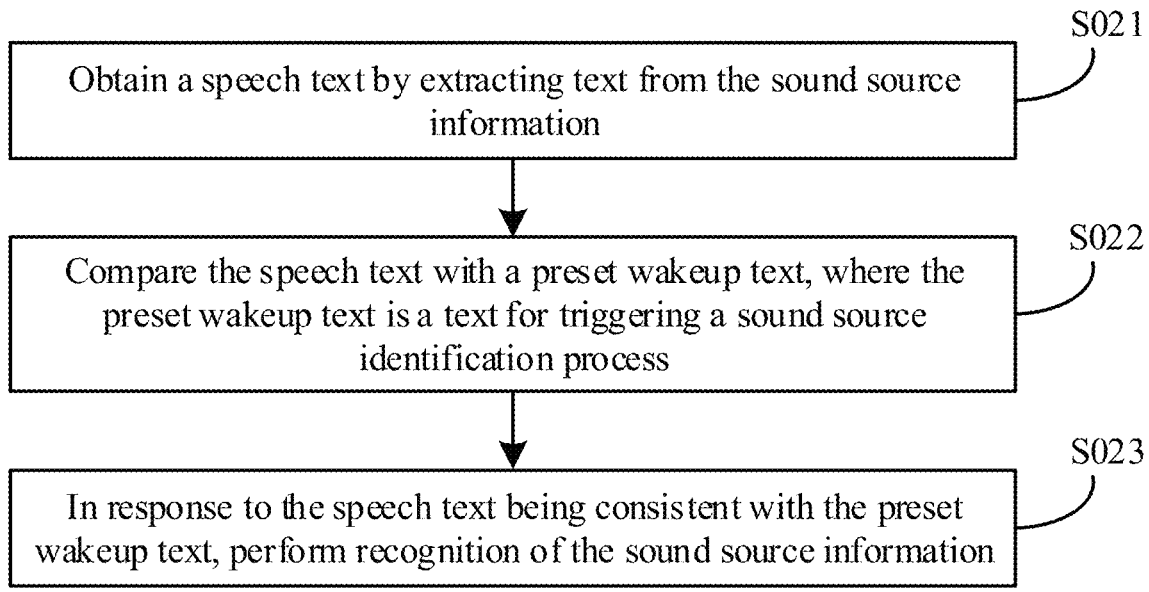
FIG. 11 shows a flow diagram of a comparison method of a wakeup text according to some embodiments of the present application.

FIG. 11 shows a flow diagram of a comparison method of the wakeup text according to some embodiments of the present application. Specifically, referring to FIG. 11, before determining the sound source orientation information by recognizing the sound source information, the controller is further configured to execute the following steps as shown in FIG. 11.

S021, Obtain a speech text by extracting text from the sound source information.

S022, Compare the speech text with a preset wakeup text, where the preset wakeup text is a text for triggering a sound source identification process.

S023, In response to the speech text being consistent with the preset wakeup text, perform recognition of the sound source information.

In some embodiments, after obtaining the sound source information, the controller first extracts the text in the voice data to determine the speech text during user's voice interaction with the display apparatus. The speech text extracted is compared with the preset wakeup text. If the speech text is inconsistent with the preset wakeup text, for example, the voice data of the user is not "Hisense Xiaoju", but other voice content, it means that the current voice of the user is not the voice data required to trigger the adjustment of the photographing angle of the camera, and the controller does not need to execute the relevant step of adjusting the photographing angle of the camera.

If the speech text is consistent with the preset wakeup text, it means that the voice of the current user is the voice required to trigger the adjustment of the photographing angle of the camera. For example, the voice data is the preset "Hisense Xiaoju". Thus, the controller may continue to execute the subsequent step of adjusting the photographing angle of the camera.

When it is determined that the sound source information is a wakeup voice, that is, a trigger voice for adjusting the photographing angle of the camera, the controller needs to execute a subsequent process of sound source identification.

Since the display apparatus has a plurality of sets of sound collectors, the plurality of sets of sound collectors may collect a plurality of sets of sound source information when the same user is speaking. When the controller obtains the sound source information collected by the sound collectors, the sound source information generated by the user when the user is speaking and collected by each sound collector may be obtained, that is, the controller obtains the plurality of sets of sound source information.

Figure 12A:
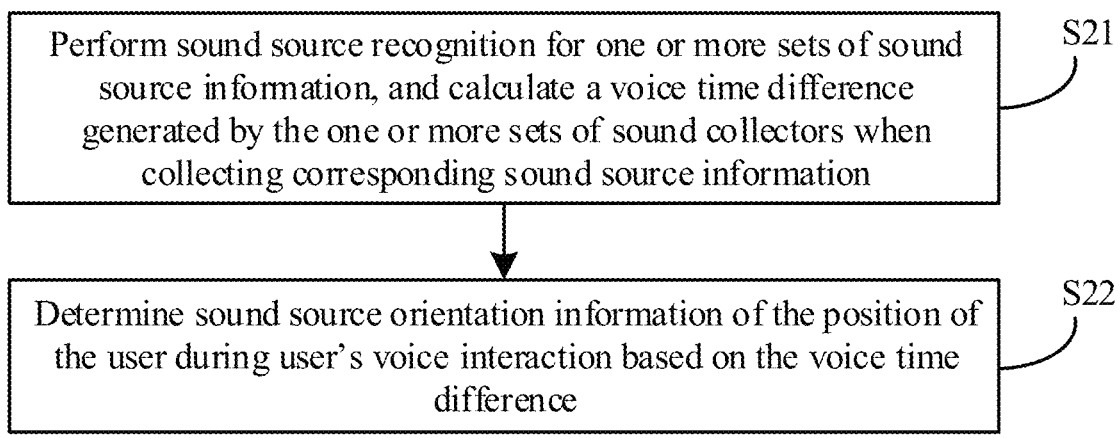
FIG. 12A shows a flow diagram of a method for performing sound source identification on sound source information according to some embodiments of the present application.

FIG. 12A shows a flow diagram of a method for performing sound source identification on the sound source information according to some embodiments of the present application. When the plurality of sets of sound collectors collect the same wakeup text, because a distance between a sound collector and the user is not the same, this sound source information may be recognized to determine the azimuth angle of the user when the user is speaking, namely, the sound source orientation information.

In some embodiments, referring to FIG. 12A, when determining the sound source orientation information by recognizing the sound source information, the controller is further configured to execute the following steps.

S21, Perform sound source recognition for one or more sets of sound source information, and calculate a voice time difference generated by the one or more sets of sound collectors when collecting corresponding sound source information.

S22, Determine sound source orientation information of the position of the user during user's voice interaction based on the voice time difference.

A frequency response of each sound collector is consistent, and its sampling clock is synchronous as well. Since a distance between each sound collector and the user is not the same, the time when each sound collector can collect the voice is not the same, and there will be a collecting time difference among the plurality of sets of sound collectors.

In some embodiments, an angle and distance from the sound source to an array may be calculated through a sound collector array to track the sound source at the position of the user when the user is speaking. Based on a time difference of arrival (TDOA) sound source positioning technology, the time difference between signals, arriving at every two microphones, is estimated, so as to obtain a set of equations associated with sound source position coordinates, and then solve the set of equations to obtain precise azimuth coordinates of the sound source, namely, the sound source orientation information.

Figure 12B:
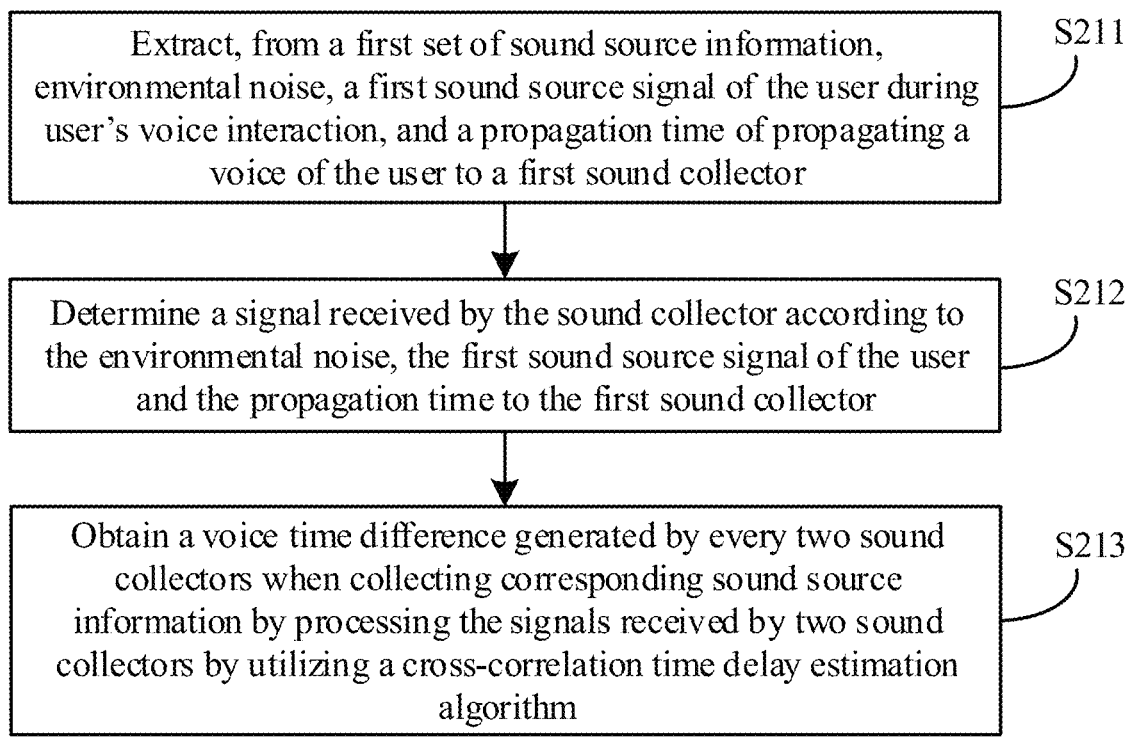
FIG. 12B shows a flow diagram of a process of S21 in FIG. 12A according to some embodiments of the present application.

In some embodiments, in step S21, when sound source recognition is performed for each piece of sound source information respectively, and calculating a voice time difference generated by one or more sets of sound collectors when collecting corresponding sound source information, the controller is further configured to execute the following steps as shown in FIG. 12B.

S211, Extract, from a first set of sound source information, environmental noise, a first sound source signal of the user during user's voice interaction, and a propagation time of propagating a voice of the user to a first sound collector.

S212, Determine a signal received by the sound collector according to the environmental noise, the first sound source signal of the user and the propagation time to the first sound collector.

S213, Obtain a voice time difference generated by every two sound collectors when collecting corresponding sound source information by processing the signals received by two sound collectors by utilizing a cross-correlation time delay estimation algorithm.

When calculating the voice time difference between every two sound collectors, the sound collector array may be used to perform direction-of-arrival (DOA) estimation of the sound source. The time differences of the sound arrival at different sound collector arrays are determined through a DOA estimation algorithm.

In a sound source orientation detecting system, a target signal received by an element of the sound collector array is from the same sound source. Therefore, the signals of those paths are highly correlated. By calculating a correlation function between every two paths of signals, a time delay between the observed signals of every two sound collectors may be determined, namely, the voice time difference.

The sound source information generated by the user when the user is speaking includes the environmental noise and the sound source signal of the user when the user is speaking. The propagation time of propagating the voice of the user to a sound collector may further be extracted from the sound source information through identification, and the signal received by the sound collector is calculated.

$$x_i(t) = \alpha_i s(t - \tau_i) + n_i(t)$$

In the formula, $x_i(t)$ is a received signal of the $i^{th}$ sound collector, $s(t)$ is the sound source signal of the user when the user is speaking, $\tau_i$ is the propagation time of propagating the voice of the user to the $i^{th}$ sound collector, $n_i(t)$ is the environmental noise, and $\alpha_i$ is a correction coefficient.

The cross-correlation time delay estimation algorithm is utilized to process the received signal of each sound collector and estimate the time delay, which is expressed as:

$$R_{x_i x_{i+1}}(\tau) = E(x_i(t) \cdot x_{i+1}(t-\tau)).$$

In the formula, $R_{x_i x_{i+1}}(\tau)$ is a time delay between the $i^{th}$ sound collector and the $(i+1)^{th}$ sound collector, namely, the voice time difference.

It is substituted into a received signal model of a sound collector to obtain:

$$R_{x_i x_{i+1}}(\tau) = \alpha_i \alpha_{i+1} E(t-\tau_i) s(t-\tau_{i+1}-\tau)) + \alpha_i E(s(t-\tau_i) n_{i+1}(t-\tau)) + \alpha_{i+1} E(s(t-\tau_{i+1}-\tau) n_{i+1}(t)) + E(n_i(t) n_{i+1}(t-\tau))$$

Since $s(t)$ and $n_i(t)$ are mutually uncorrelated, the above equation may be simplified as:

$$R_{x_i x_{i+1}}(\tau) = \alpha_i \alpha_{i+1} R_{ss}(t - \tau_{i_{i+1}}) + R_{n_i n_{i+1}}(\tau).$$

Where, $\tau_{i_{i+1}} = \tau_i - \tau_{i+1}$, $n_i$ and $n_{i+1}$ are uncorrelated white Gaussian noise, so the above formula is further simplified as:

$$R_{x_i x_{i+1}}(\tau) = \alpha_i \alpha_{i+1} R_{ss}(t - \tau_{i_{i+1}}).$$

It can be seen from the property of the cross-correlation time delay estimation algorithm that, when $$\tau_{i_{i+1}} = \tau_i - \tau_{i+1}, R_{x_i x_{i+1}}(\tau)$$

takes the maximum value and is the time delay of the two sound collectors, namely, the voice time difference.

In a practical signal processing model of the sound collector array, due to reverberation and noise, a peak value of $R_{x_i x_{i+1}}(\tau)$ is not obvious, which reduces precision of time delay estimation. In order to sharpen the peak value of $R_{x_i x_{i+1}}(\tau)$, a cross-power spectrum may be weighted in the frequency domain according to prior knowledge of the signal and noise, so as to suppress noise and reverberation interference. Finally, inverse Fourier transform is performed to obtain a generalized cross correlation function $R_{x_i x_{i+1}}(\tau)$:

$$R_{x_i x_{i+1}}(\tau) = \int_0^\pi \varphi_{ii+1}(\omega) X_{i+1}*(\omega) e^{-j\omega \tau} d\omega;$$

Where, $\varphi_{ii+1}(\omega)$ represents a frequency domain weighting function.

Finally, PHAT weighting is employed to make the cross-power spectrum between the signals more smooth, and the final voice time difference $R_{x_i x_{i+1}}(\tau) = \alpha_i \alpha_{i+1} \delta(\tau - \tau_{ii+1})$ generated by every two sound collectors when collecting the corresponding sound source information is obtained. The PHAT weighted cross-power spectrum is approximate to an expression of a unit impulse response, and the peak value of the time delay is highlighted, which can effectively suppress reverberation noise, and improve the precision and accuracy of time delay (voice time difference) estimation.

Figure 12C:
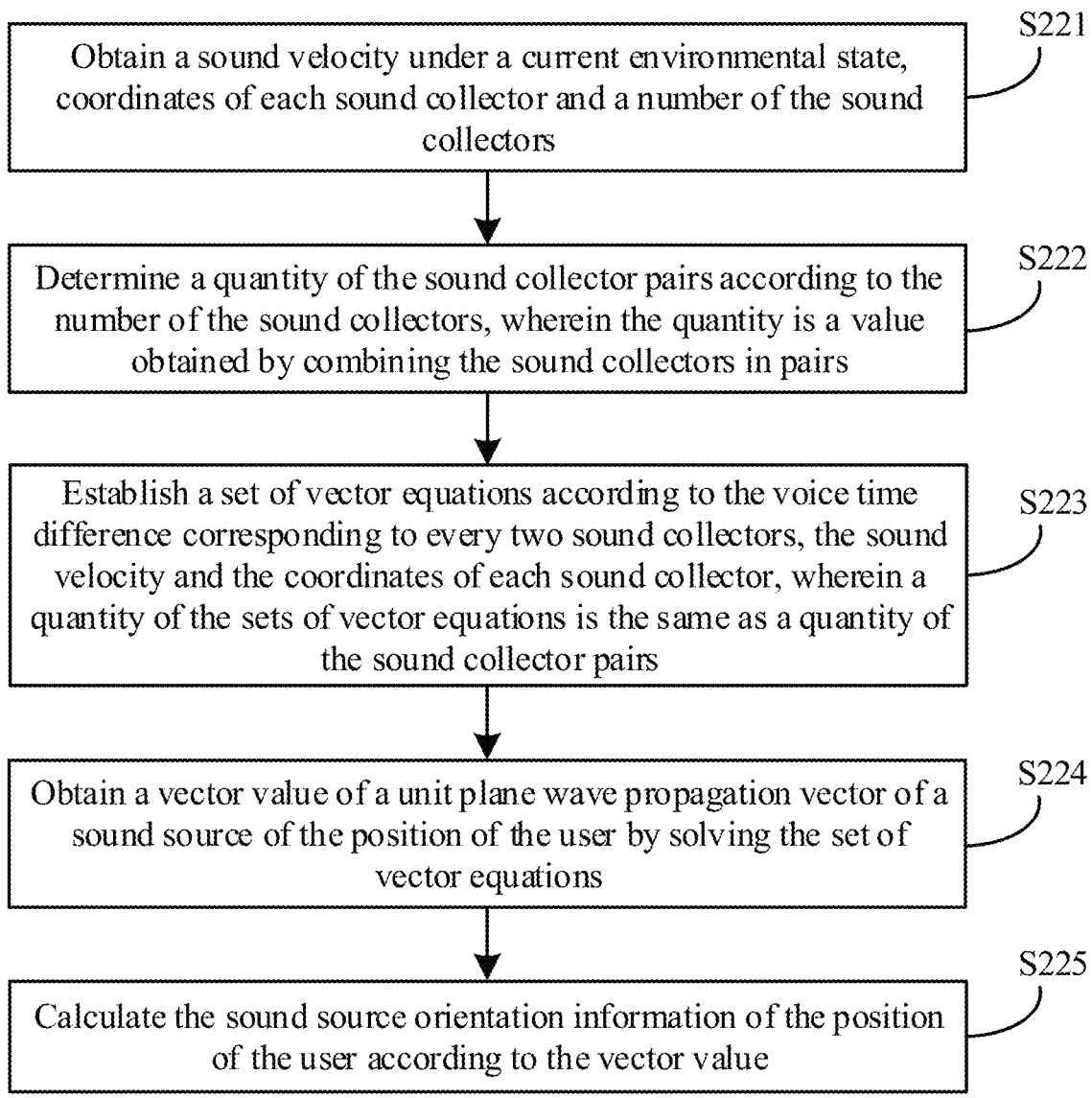
FIG. 12C shows a flow diagram of a process of S22 in FIG. 12A according to some embodiments of the present application.

In some embodiments, in step S22, when calculating the sound source orientation information of the position of the user based on the voice time difference, the controller is further configured to execute the following steps as shown in FIG. 12C.

S221, Obtain a sound velocity under a current environmental state, coordinates of each sound collector and a number of the sound collectors.

S222, Determine a quantity of the sound collector pairs according to the number of the sound collectors, wherein the quantity is a value obtained by combining the sound collectors in pairs.

S223, Establish a set of vector equations according to the voice time difference corresponding to every two sound collectors, the sound velocity and the coordinates of each sound collector, wherein a quantity of the sets of the vector equations is the same as a quantity of the sound collector pairs S224, Obtain a vector value of a unit plane wave propagation vector of a sound source of the position of the user by solving the set of vector equations.

S225, Calculate the sound source orientation information of the position of the user according to the vector value.

After calculating the voice time difference of every two sound collectors according to the method in the aforementioned embodiment, the sound source orientation information of the position of the user when the user is speaking may be calculated according to each voice time difference.

When calculating the sound source orientation information, it is necessary to establish a plurality of sets of vector equations. To ensure the accuracy of calculation results, the quantity of the sets of the vector equations may be configured to be the same as the quantity of the sound collector pairs. In view of this, the number of the sound collectors is N, and then there are totally $N(N-1)/2$ pairs of combination pairs by combining all the sound collectors in pairs.

When establishing the vector equation set, the sound velocity c under the current environmental state and the coordinates of each sound collector are obtained, and the coordinates of the $k^{th}$ sound collector are denoted as $(x_k, y_k, z_k)$. In this case, the unit plane wave propagation vector of the sound source of the position of the user is configured as $u=(u, v, w)$, and the vector value of the unit plane wave propagation vector of the sound source of the position of the user is solved so as to determine the sound source orientation information.

According to the voice time difference $R_{x_i x_{i+1}}(\tau)$ corresponding to every two sound collectors, the sound velocity c, the coordinates $(x_k, y_k, z_k)$ of each sound collector, and the unit plane wave propagation vector (u, v, w) of the sound source of the position of the user when the user is speaking, $N(N-1)/2$ vector equation sets are established by the following formula:

$$c \cdot R_{x_i x_j}(\tau) = u \cdot (x_i - x_j) + v \cdot (y_i - y_j) + w \cdot (z_i - z_j).$$

The above formula represents the vector equation set established between the $i^{th}$ sound collector and the $j^{th}$ sound collector.

Taking N=3 as an example, the following equation sets may be established:

$c \cdot R_{x_2 x_1}(\tau) = u \cdot (x_2 - x_1) + v \cdot (y_2 - y_1) + w \cdot (z_2 - z_1)$, (the vector equation set established between the first sound collector and the second sound collector);

$c \cdot R_{x_3 x_1}(\tau) = u \cdot (x_3 - x_1) + v \cdot (y_3 - y_1) + w \cdot (z_3 - z_1)$, (the vector equation set established between the first sound collector and the third sound collector); and $c \cdot R_{x_2 x_3}(\tau) = u \cdot (x_2 - x_3) + v \cdot (y_2 - y_3) + w \cdot (z_2 - z_3)$, (the vector equation set established between the third sound collector and the second sound collector).

The above three vector relationship equation sets are written in a matrix form:

$$\begin{bmatrix} (x_2 - x_1)(y_2 - y_1)(z_2 - z_1) \\ (x_3 - x_1)(y_3 - y_1)(z_3 - z_1) \\ (x_2 - x_3)(y_2 - y_3)(z_2 - z_3) \end{bmatrix} \cdot \begin{bmatrix} u \\ v \\ w \end{bmatrix} = \begin{bmatrix} c \cdot R_{x_2 x_1}(\tau) \\ c \cdot R_{x_3 x_1}(\tau) \\ c \cdot R_{x_2 x_3}(\tau) \end{bmatrix};$$

where, $u=(u, v, w)$ is solved according to the above matrix, and then the angle value may be obtained by utilizing a sine-cosine relationship:

$$\theta = a\cos\left(\frac{1}{w}\right),$$

that is the sound source angle information of the position of the user when the user is speaking.

S3, Determine a target rotation direction of the camera and a target rotation angle of the camera according to the first photographing angle of the camera and the sound source orientation information.

The controller performs sound source identification on the sound source information so as to determine the sound source orientation information for indicating the azimuth angle of the position of the user when the user is speaking. The sound source orientation information may identify the current position of the user, and the current photographing angle of the camera may identify the current position of the camera. According to a difference angle between the two positions, the target rotation angle that the camera needs to rotate and the target rotation direction when the camera rotates may be determined.

Figure 13A:
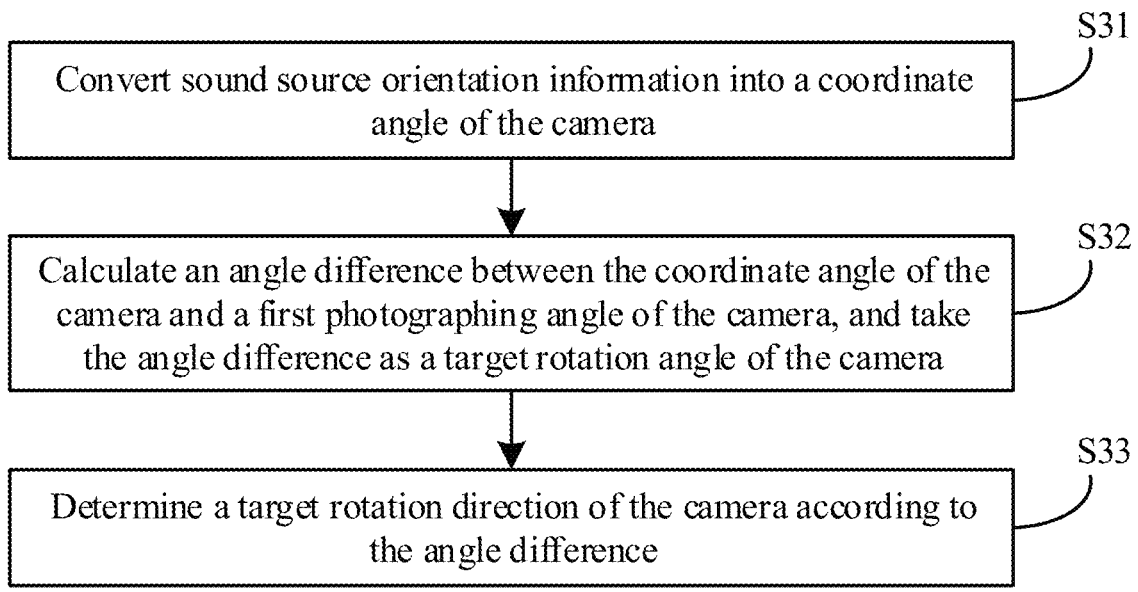
FIG. 13A shows a flow diagram of a method for determining a target rotation direction and a target rotation angle of a camera according to some embodiments of the present application.

FIG. 13A shows a flow diagram of a method for determining a target rotation direction of the camera and a target rotation angle of the camera according to some embodiments of the present application. Specifically, referring to FIG. 13A, when determining the target rotation direction of the camera and the target rotation angle of the camera according to the first photographing angle of the camera and the sound source orientation information, the controller is further configured to execute the following steps.

S31, Convert sound source angle information into a coordinate angle of the camera.

Since the sound source orientation information represents the azimuth angle of the user, in order to accurately calculate the azimuth angle that the camera needs to adjust according to the sound source orientation information and the current photographing angle of the camera, the sound source orientation information of the user may be converted into the coordinate angle of the camera, that is, replacing the sound source orientation information of the user with the coordinate angle of the camera.

Figure 13B:
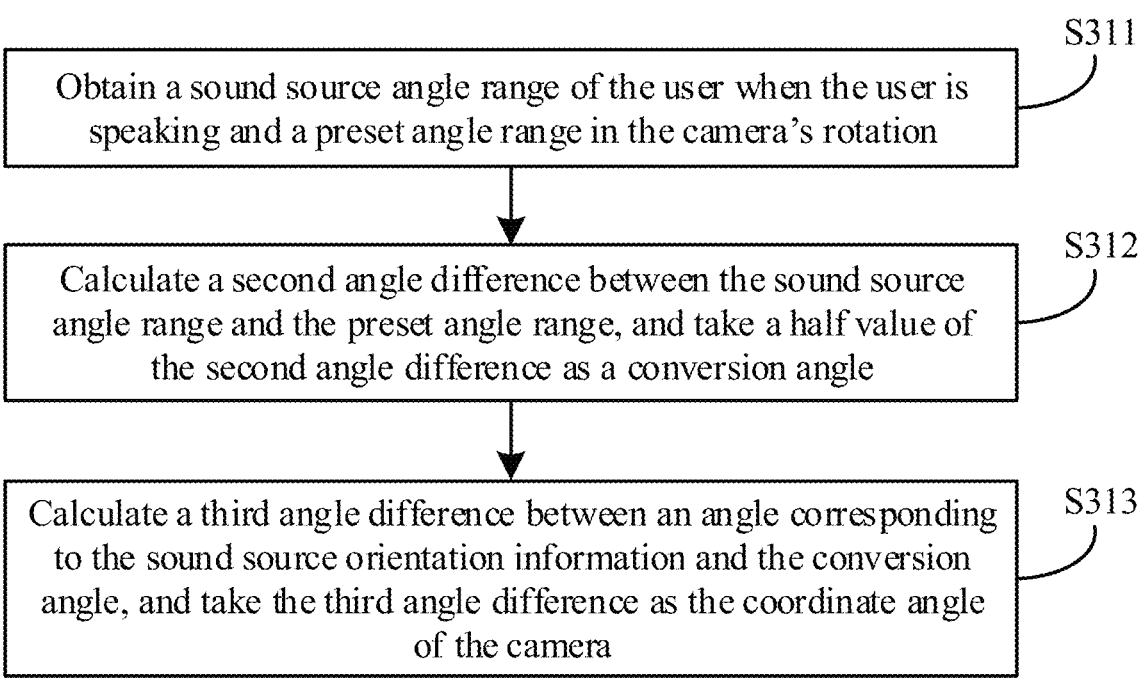
FIG. 13B shows a flow diagram of a process of converting the sound source orientation information into the coordinate angle of the camera according to some embodiments of the present application.

Specifically, when converting the sound source orientation information into the coordinate angle of the camera, the controller is further configured to execute the following steps as shown in FIG. 13B.

S311, Obtain a sound source angle range of the user when the user is speaking and a preset angle range in the camera's rotation.

S312, Calculate a second angle difference between the sound source angle range and the preset angle range, and take a half value of the second angle difference as a conversion angle.

S313, Calculate a third angle difference between an angle corresponding to the sound source orientation information and the conversion angle, and take the third angle difference as the coordinate angle of the camera.

Because the sound source angle range is different from the preset rotation angle range of the camera, the preset rotation angle range is 0°-120°, the sound source angle range is 0°-180°, and thus the coordinate angle of the camera cannot directly replace the sound source angle information. Therefore, the angle difference between the sound source angle range and the preset angle range is calculated first, and then the half value of the angle difference is calculated, that is the median value of the angle difference, so as to take the median value as the conversion angle for converting the sound source orientation information to the coordinate angle of the camera.

The angle difference between the sound source angle range and the preset angle range is 60°, the median value of the angle difference is 30°, and 30° is taken as the conversion angle. Then, the angle difference between the angle corresponding to the sound source orientation information and the conversion angle is calculated, namely, the coordinate angle of the camera is converted from the sound source angle information.

For example, if the user is located on left side of the sound collector, the angle corresponding to the sound source orientation information determined by the controller through obtaining the sound source information collected by the plurality of sound collectors is 50° and the conversion angle is 30°. Therefore, the calculated angle difference is 20°, that is, the angle 50° corresponding to the sound source orientation information is replaced by the coordinate angle 20° of the camera for representation.

If the user is located on right side of the sound collector, the angle corresponding to the sound source orientation information determined by the controller through obtaining the sound source information collected by the plurality of sound collectors is 130° and the conversion angle is 30°. Therefore, the angle difference is determined as 100°, that is, the angle 130° corresponding to the sound source orientation information is replaced by the coordinate angle 100° of the camera for representation.

S32, Calculate an angle difference between the coordinate angle of the camera and a first photographing angle of the camera, and take the angle difference as a target rotation angle of the camera.

The coordinate angle of the camera is configured to identify the angle of the position of the user within the camera coordinates. Therefore, the target rotation angle that the camera needs to rotate may be determined according to the angle difference between the current photographing angle of the camera and the coordinate angle of the camera.

For example, if the current photographing angle of the camera is 100° and the coordinate angle of the camera is 20°, it means that the current photographing area of the camera is not aligned with the position of the user, and the difference between the current photographing angle and the coordinate angle is 80°. Therefore, the photographing area of the camera can be aligned with the position of the user only after the camera rotates by 80°, that is, the target rotation angle of the camera is 80°.

S33, Determine a target rotation direction of the camera according to the angle difference.

Facing the display apparatus, left side is regarded as the 0° position of the camera and right side is regarded as the 120° position of the camera, after the angle difference is determined according to the coordinate angle of the camera and the current photographing angle of the camera, if the current photographing angle is greater than the coordinate angle, it means that the photographing angle of the camera is located on right side of the position of the user, and the angle difference is a negative value in this case; and if the current photographing angle is less than the coordinate angle, it means that the photographing angle of the camera is located on left side of the position of the user, and the angle difference is a positive value in this case.

In some embodiments, the target rotation direction of the camera may be determined according to the positive or negative angle difference. If the angle difference is a positive value, it means that the photographing angle of the camera is located on left side of the position of the user. In this case, in order to cause the camera take a picture of the user, the photographing angle of the camera needs to be adjusted towards right, and then it is determined that the target rotation direction of the camera is rightward rotation.

If the angle difference is a negative value, it means that the photographing angle of the camera is located on right side of the position of the user. In this case, in order to cause the camera to take a picture of the user, the photographing angle of the camera needs to be adjusted towards left, and then it is determined that the target rotation direction of the camera is leftward rotation.

Figure 14:
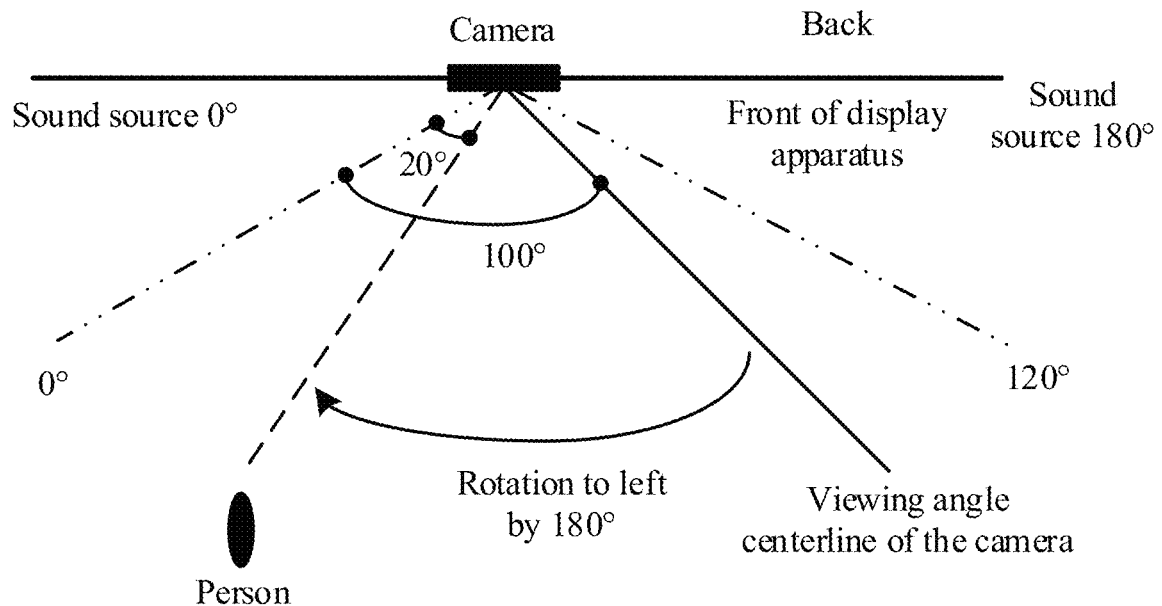
FIG. 14 shows a scenario diagram for adjusting a photographing angle of a camera according to some embodiments of the present application.

For example, FIG. 14 shows a scenario diagram for adjusting the photographing angle of the camera according to some embodiments of the present application. Referring to FIG. 14, if the angle corresponding to the sound source orientation information of the user is 50°, the converted coordinate angle of the camera is 20°. The current photographing angle of the camera is 100°, that is, a viewing angle centerline of the camera is located on right side of the position of the user, and the calculated angle difference is −80°. It can be seen that the angle difference is the negative value. In this case, the camera needs to be adjusted to rotate to left by 80°.

Figure 15A:
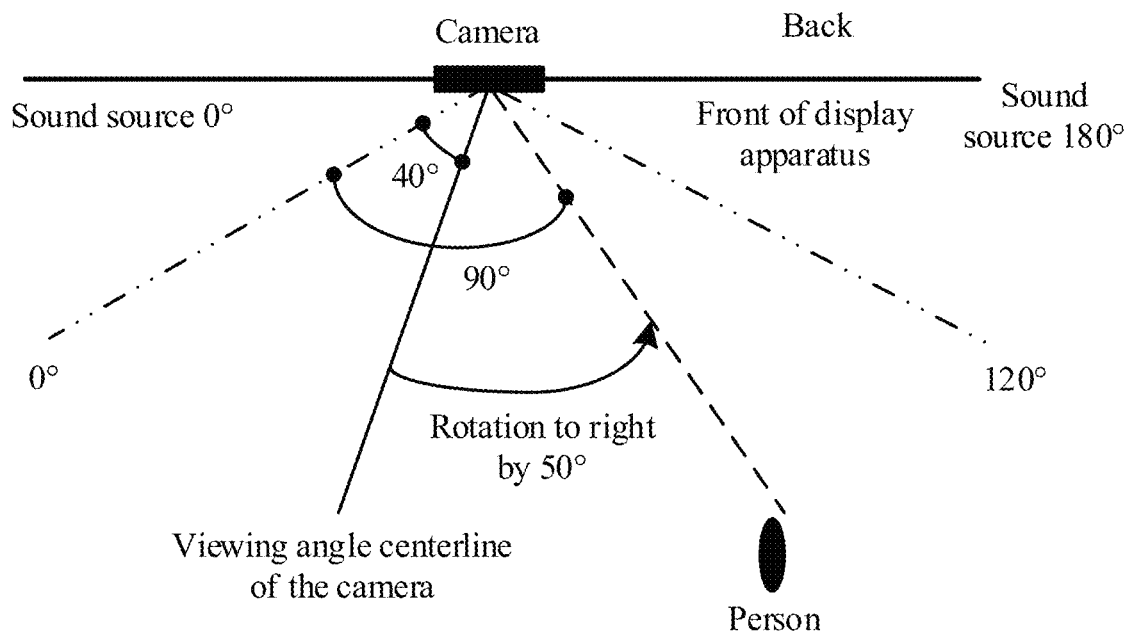
FIG. 15A shows another scenario diagram for adjusting a photographing angle of a camera according to some embodiments of the present application.

FIG. 15A shows another scenario diagram for adjusting the photographing angle of the camera according to some embodiments of the present application. Referring to FIG. 15A, if the angle corresponding to the sound source orientation information of the user is 120°, the converted coordinate angle of the camera is 90°. The current photographing angle of the camera is 40°, that is, the viewing angle centerline of the camera is located on left side of the position of the user, and the angle difference is determined as 50°. The angle difference is a positive value. The camera needs to be adjusted by rotating to right by 50°.

S4, Obtain a second photographing angle of the camera by adjusting the first photographing angle of the camera according to the target rotation direction and the target rotation angle, where a photographing area of the camera corresponding to the second photographing angle faces the position of the user when the user is speaking.

After the controller determines the target rotation direction and the target rotation angle required for the camera to adjust the photographing angle, the photographing angle of the camera may be adjusted according to the target rotation direction and the target rotation angle, the photographing area of the camera directly faces the position of the user, such that the camera can photograph the images including the user, and the photographing angle of the camera is adjusted according to the position of the user.

Figure 15B:
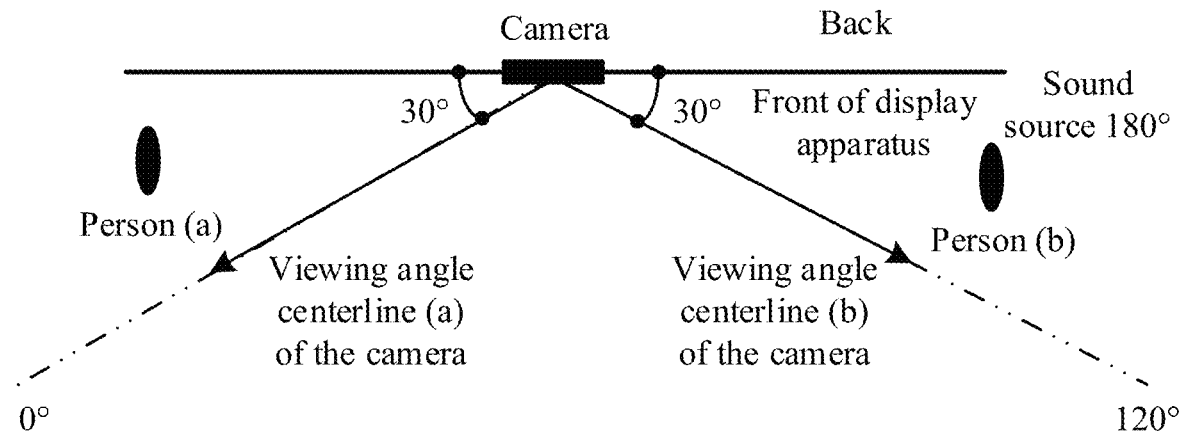
FIG. 15B shows a scenario diagram of a position of a person when he/she is speaking according to some embodiments of the present application.
Figure 16:
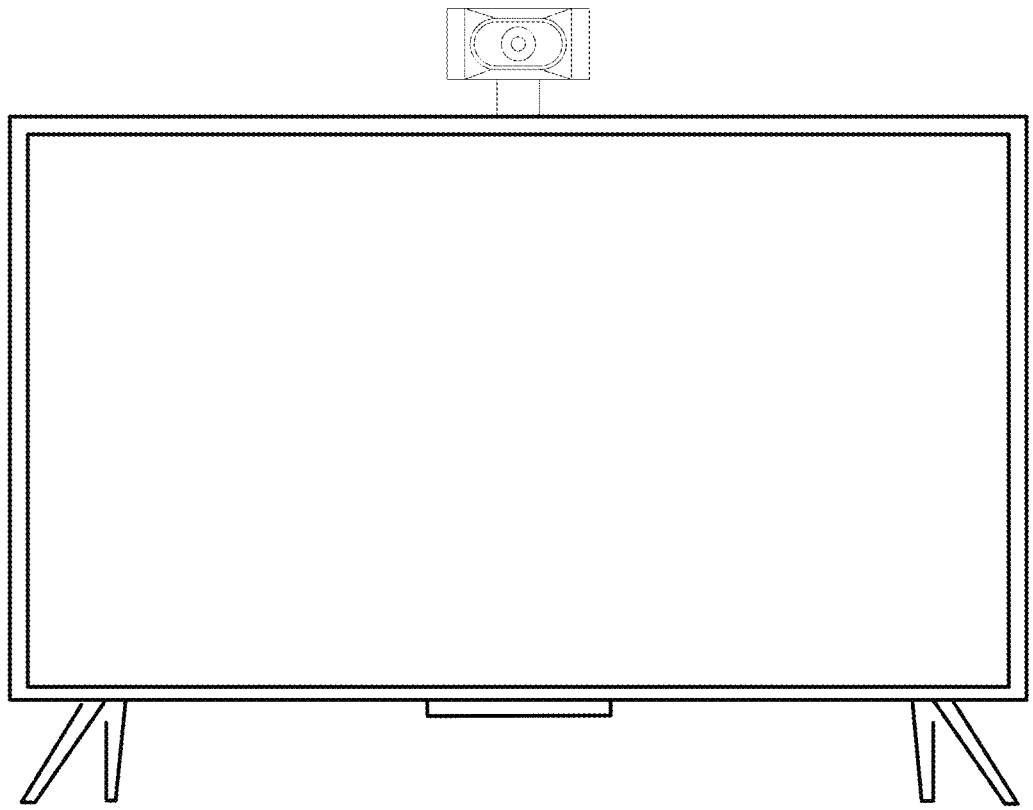
FIG. 16 shows a schematic diagram of an arrangement structure of a display apparatus and a camera according to some embodiments of the present application.

FIG. 15B shows a scenario diagram of the position of the user when the user is speaking according to some embodiments of the present application. Since the preset angle range of the camera is different from the sound source angle range of the user when the user is speaking, which is reflected in the schematic diagram of the angle shown in FIG. 15B, there is an angle difference 30° between the 0° position of the preset angle range and the 0° position of the sound source angle range. Similarly, there is an angle difference 30° between the 120° position of the preset angle range and the 180° position of the sound source angle range as well.

Then, the position of the user is exactly located within the included angle area range of 30° during user's interaction with the display apparatus, as shown in FIG. 15B, the position of the user (a) or the position of the user (b). In this case, when the controller executes the above step S31 to convert the sound source orientation information into the coordinate angle of the camera, a situation where the coordinate angle of the camera obtained from the conversion of the sound source orientation information of the user is a negative value or greater than the maximum value of the preset angle range of the camera may occur, that is, the coordinate angle of the camera obtained by conversion is not located within the preset angle range of the camera.

For example, if the sound source orientation information corresponding to the position of the user (a) is 20° and the conversion angle is 30°, the calculated coordinate angle of the camera is −10°. If the sound source orientation information corresponding to the position of the user (b) is 170° and the conversion angle is 30°, the coordinate angle of the camera is determined as 140°. It can be seen that the coordinate angles of the camera converted respectively according to the position of the user (a) and the position of the user (b) both exceed the preset angle range of the camera.

If the coordinate angles of the camera both exceed the preset angle range of the camera, it means that the camera cannot rotate to the position corresponding to the coordinate angle (the position of the user when the user is speaking) of the camera. However, since the visual angle range of the camera is located between 60° and 75°, it means that when the camera rotates to the 0° position or the 120° position, the visual angle range can cover the 30° angle difference between the 0° position of the preset angle range and the 0° position of the sound source angle range, and 30° angle difference between the 120° position of the preset angle range and the 180° position of the sound source angle range.

Therefore, if the position of the user is located within the 30° angle difference range between the 0° position of the preset angle range and the 0° position of the sound source angle range, or within the 30° angle difference range between the 120° position of the preset angle range and the 180° position of the sound source angle range, in order to cause the camera to take a picture containing the user, the photographing angle of the camera is adjusted according to the position corresponding to the minimum value or maximum value of the preset angle range of the camera.

In some embodiments, the controller is further configured to execute the following steps: in response to the coordinate angle of the camera converted from the sound source orientation information of the user exceeding the preset angle range of the camera, determining the target rotation direction and the target rotation angle of the camera according to the angle difference between the current photographing angle of the camera and the minimum value or maximum value of the preset angle range.

For example, if the user (a) is located within the range of 30° angle difference between the 0° position of the preset angle range and the 0° position of the sound source angle range, that is, when the sound source angle corresponding to the sound source orientation information of the user (a) is 20° and the current photographing angle of the camera is 50°, the angle difference is calculated according to the minimum value of 0° of the preset angle range of the camera and the current photographing angle of 50°, the angle difference is −50°, and then it is determined that the target rotation direction of the camera is leftward rotation and the target rotation angle is 50°. In this case, the viewing angle centerline (a) of the camera coincides with the 0° line of the camera.

If the user (b) is located within the range of 30° angle difference between the 120° position of the preset angle range and the 180° position of the sound source angle range, that is, when the sound source angle corresponding to the sound source orientation information of the user (b) is 170° and the current photographing angle of the camera is 50°, the angle difference is calculated according to the maximum value of 120° of the preset angle range of the camera and the current photographing angle of 50°, the angle difference is 70°, and then it is determined that the target rotation direction of the camera is rightward rotation and the target rotation angle is 70°. In this case, the viewing angle centerline (b) of the camera coincides or meets with the 120° line of the camera.

Therefore, even if the sound source angle corresponding to the position of the user exceeds the preset angle range when the camera rotates, the display apparatus according to the embodiments of the present application may still rotate the camera to the position of the minimum value or maximum value corresponding to the preset angle range according to the position of the user, and take a picture with the user according to the visual angle coverage range of the camera.

It can be seen that according to the embodiments of the present application, the camera can rotate within the preset angle range, and the controller is configured to: obtain the sound source information collected by a sound collector and perform sound source identification, so as to determine the sound source orientation information which is configured for indicating the azimuth angle of the position of the user; determine the target rotation direction and the target rotation angle of the camera based on the current photographing angle of the camera and the sound source orientation information; and adjust the photographing angle of the camera according to the target rotation direction and the target rotation angle, such that the photographing area of the camera directly faces the position of the user when he/she is speaking. It can be seen that the display apparatus provided by the present application may utilize the sound source information to trigger rotation of the camera, and can automatically identify the real-time position of the user and adjust the photographing angle of the camera, so that the camera can always photograph the image containing the target object.

FIG. 10A shows a flow diagram of a method for adjusting a photographing angle of a camera according to some embodiments of the present application. Referring to FIG. 10A, the method for adjusting the photographing angle of the camera according to the embodiments of the present application is executed by the controller in the display apparatus discussed above, and the method includes the following steps S1 to S4.

S1, Obtain sound source information collected by a sound collector of the display apparatus and a first photographing angle of a camera in the display apparatus. The sound source information is sound information generated during user's voice interaction with the display apparatus.

S2, Determine sound source orientation information by recognizing the sound source information, where the sound source orientation information is configured for indicating an azimuth angle of a position of the user during user's voice interaction.

S3, Determine a target rotation direction of the camera and a target rotation angle of the camera according to the first photographing angle of the camera and the sound source orientation information.

S4, Obtain a second photographing angle of the camera by adjusting the first photographing angle of the camera according to the target rotation direction and the target rotation angle, where a photographing area of the camera corresponding to the second photographing angle faces the position of the user during user's voice interaction.

In some embodiments of the present application, before determining the sound source orientation information by recognizing the sound source information, the method further includes: obtaining a speech text by extracting text from the sound source information; comparing the speech text with a preset wakeup text, where the preset wakeup text is a text for triggering a sound source identification process; and in response to the speech text being consistent with the preset wakeup text, perform recognition of the sound source information.

In some embodiments of the present application, the display apparatus includes a plurality of sound collectors, and the obtaining the sound source information collected by the sound collector, further includes: obtaining the sound source information generated by the user and collected by the sound collector; and the determining the sound source orientation information by recognizing the sound source information includes: recognizing the sound source information from the plurality of sound collectors respectively, and calculating a voice time difference generated by the plurality of sound collectors during collection of corresponding sound source information; and calculating the sound source orientation information of the position of the user based on the voice time difference.

In some embodiments of the present application, the recognition of sound source information respectively, and calculating the voice time difference generated by the plurality of sound collectors during collection of corresponding sound source information include: extracting, from the sound source information, environmental noise, a sound source signal of the user, and a propagation time of propagating a voice of the user to a first sound collector; determining a signal received by the first sound collector according to the environmental noise, the sound source signal and the propagation time; and obtaining a voice time difference generated by every two sound collectors by processing the signals received by the plurality of sound collector by utilizing a cross-correlation time delay estimation algorithm.

In some embodiments of the present application, the calculating the sound source orientation information of the position of the user based on the voice time difference includes: obtaining a sound velocity under a current environmental state, coordinates of each sound collector and a number of the sound collectors; determining a quantity of the sound collector pairs according to the number of the sound collectors, where the quantity is a value obtained by combining the sound collectors in pairs; establishing a vector equation set according to the voice time difference corresponding to every two sound collectors, the sound velocity and the coordinates of each sound collector, where a quantity of the vector equation set is the same as the quantity of the sound collector pairs; obtaining a vector value of a unit plane wave propagation vector of a sound source of the position of the user by solving the vector equation set; and calculating the sound source orientation information of the position of the person according to the vector value.

In some embodiments of the present application, before obtaining the first photographing angle of the camera, the method further includes: inquiring about a current work state of the camera; in response to the current work state of the camera being a rotating state, waiting for the camera to finish rotating; and in response to the current work state of the camera being a non-rotating state, obtaining the first photographing angle of the camera.

In some embodiments of the present application, the determining the target rotation direction and the target rotation angle of the camera according to the current photographing angle of the camera and the sound source orientation information, includes: converting the sound source orientation information into a coordinate angle of the camera; calculating a first angle difference between the coordinate angle of the camera and the first photographing angle of the camera, and taking the first angle difference as the target rotation angle of the camera; and determining a target rotation direction of the camera according to the first angle difference.

In some embodiments of the present application, the converting the sound source orientation information into the coordinate angle of the camera includes: obtaining a sound source angle range of the user during user's voice interaction and a preset angle range in the camera's rotation; calculating a second angle difference between the sound source angle range and the preset angle range, and taking a half value of the second angle difference as a conversion angle; and calculating a third angle difference between an angle corresponding to the sound source orientation information and the conversion angle, and take the third angle difference as the coordinate angle of the camera.

In some embodiments of the present application, the determining the target rotation direction of the camera according to the first angle difference includes: in response to the first angle difference being a positive value, determining that the target rotation direction of the camera is rightward rotation; and in response to the first angle difference being a negative value, determining that the target rotation direction of the camera is leftward rotation.

In some embodiments of the present application, as shown in FIG. 15B, a camera 232, as a detector 230, may be built-in in or connect with a display apparatus 200. After starting, the camera 232 may detect image data. The camera 232 may be connected with the controller 250 through an interface component, thereby sending the detected image data to the controller 250 for processing. To detect an image, the camera 232 may include a lens component and a pan tilt component. The lens component may be an image collecting element based on a charge coupled device (CCD) or a complementary metal oxide semiconductor (CMOS) to generate image data of an electrical signal.

The lens component is disposed on the pan tilt component, and the pan tilt component may drive the lens component to rotate, so as to change an orientation of the lens component. The pan tilt component may include at least two rotating parts to respectively drive the lens component to rotate left and right and to rotate up and down. The rotating part may be connected with a motor to drive it to rotate automatically through the motor.

Figure 17:
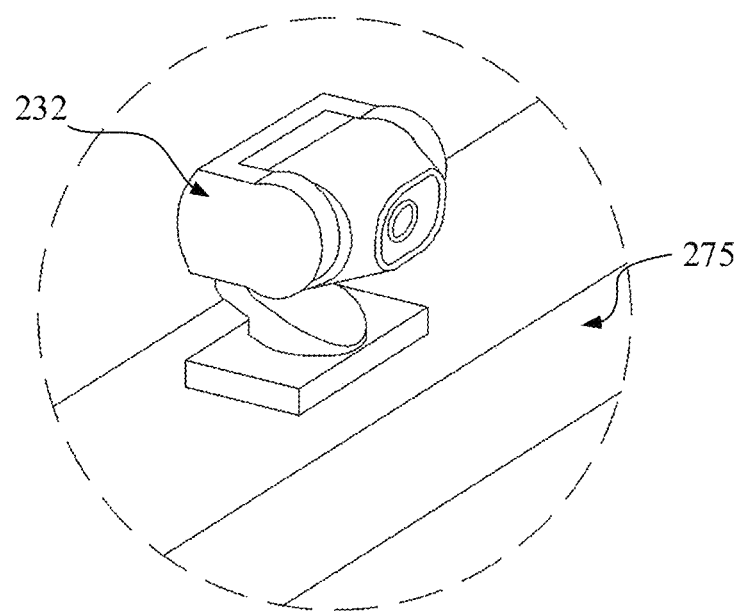
FIG. 17 is a schematic structural diagram of a camera according to some embodiments of the present application.

For example, as shown in FIG. 17, the pan tilt component may include a first rotating shaft in a vertical state and a second rotating shaft in a horizontal state. The first rotating shaft is disposed on a top of a display 275 and is rotatably connected with the top of the display 275. The first rotating shaft is further provided with a fixing member, the second rotating shaft is rotatably connected with a top of the fixing piece, and the second rotating shaft is connected with the lens component to drive the lens component to rotate. The motor and a transmission member are respectively connected with the first rotating shaft and the second rotating shaft. The motor may be a servo motor, a stepping motor and the like that can support automatic control of a rotation angle. After obtaining a command, the two motors may rotate respectively to drive the first rotating shaft and the second rotating shaft to rotate, so as to adjust the orientation of the lens component.

With different orientations of the lens component, the lens component may take a video for users at different positions, so as to obtain user image data. Obviously, the different orientations correspond to image collecting in different areas. When the user is located left relative to the position right ahead of the display 275, the first rotating shaft on the pan tilt component may drive the fixing member and the lens component to rotate left, so that the portrait position of the user is located in a central area of a picture in the photographed image. When a body imaging position of the user is located in lower portion of the image taken by the camera, the lens component may be driven to rotate upward through the second rotating shaft in the pan tilt component to raise a shooting angle, so that the portrait position of the user is located in the central area of the picture.

In order to track the position of the portrait in the shooting image, the controller 250 may identify the position of the portrait of the target in the image by executing an object positioning and tracking method. When the target position is not appropriate, the camera 232 is controlled to rotate to obtain an image with the target in a proper area. The identification of the target position may be realized through image processing. The target may be a user. For example, after starting the camera 232, the controller 250 may shoot at least one image through the camera 232 as a reference image. Feature analysis is performed in the reference image, so as to identify a portrait area in the reference image. Whether the user position is appropriate is determined by determine the position of the portrait area.

However, in practical application, an initial orientation of the camera 232 may deviate from the position of the user at some location. That is, in some cases, a shooting range of the camera 232 cannot cover the portrait of the user, thereby causing the camera 232 unable to capture the portrait of the user, or only able to obtain a small portion of the portrait. In this case, a portrait area cannot be identified during image processing, and the rotation control of the camera 232 cannot be realized when the user position is not appropriate, that is, a user not in a current image cannot be adjusted properly.

Figure 18A:
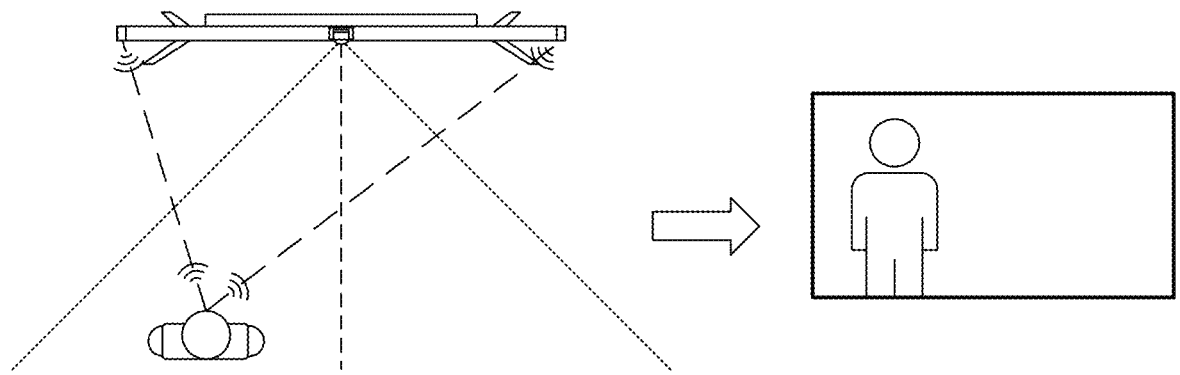
FIG. 18A shows a schematic diagram of a scenario of a display apparatus before adjustment according to some embodiments of the present application.
Figure 18B:
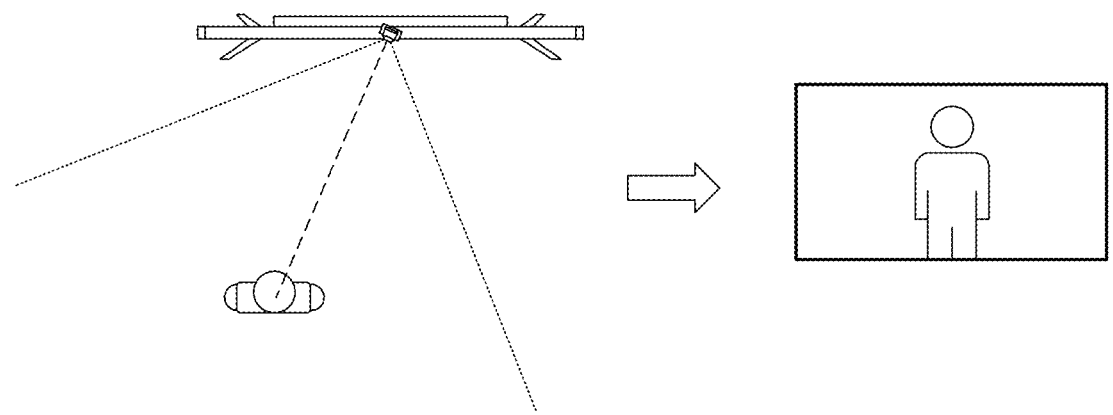
FIG. 18B shows a schematic diagram of a scenario of a display apparatus after adjustment according to some embodiments of the present application.

Therefore, in order to include the portrait area in the reference image taken by the camera 232, it can position the azimuth of the user by using a sound signal of the user before obtaining the reference image, after obtaining the azimuth information, the camera 232 is controlled first to rotate toward the user based on the azimuth information, and then the reference image is collected, so that the collected reference image can more easily cover the portrait area. Therefore, the display apparatus 200 is further provided with a sound collector 231. The sound collector 231 may be implemented as an array through a plurality of microphones, and collect the sound signal issued by the user at the same time, so as to determine the azimuth of the user through the collected sound signals. As shown in FIG. 18A and FIG. 18B, in some embodiments of the present application, an audio-visual user positioning and tracking method is provided, including: obtaining a test audio signal input from a user.

In some embodiments, a controller 250 may automatically run the audio-visual user positioning and tracking method after starting a camera 232, and obtain the test audio signal input from the user. The camera 232 may be started manually or automatically. Manual starting means that the user selects an icon corresponding to the camera 232 in an operation interface through a control device 100 such as a remote control to realize the starting. Automatic starting may be that the user executes some interactive actions that require calling the camera 232 and then realizes automatic starting of the camera. For example, the user selects a "mirror" application in a "My Application" interface. Since the mirror application needs to call the camera 232, the camera 232 is also started when the application is launched.

A pose of the camera 232 after being started may be a default initial pose, for example, the default initial pose is set as that the lens component of the camera 232 faces straight ahead. The pose after starting may also be a pose maintained when the camera 232 is configured a previous time. For example, if the camera 232 is adjusted to a pose of being raised by 45 degrees during the previous use, the pose of the camera 232 will also be the pose of being raised by 45 degrees after starting the camera 232 this time.

After starting the camera 232, the controller 250 may obtain the test audio signal input from the user through the sound collector 231. Since the sound collector 231 includes a microphone array, microphones at different positions may collect different audio signals for the same test audio.

In order to obtain the audio signals through the microphone array, after starting the camera 232, a text prompt may also be automatically presented on the display 275 and/or a voice prompt may be output through an audio output device such as a speaker to prompt the user to input test audio, such as "Please input the test audio: Hi! Xiaoju".

It should be noted that the test audio may be a variety of audio signals issued by the user, including: a voice issued by the user through speaking, a sound issued by the user through physical motions such as clapping hands, and a sound issued by the user through other handheld terminals. For example, when the user controls the display apparatus 200 through an intelligent terminal such as a mobile phone and when the user is required to input a test audio signal, the user may send a command to the intelligent terminal to control its sound emitting, so that the intelligent terminal can automatically play a specific sound after receiving the command, and thus the sound collector 231 can detect it.

In some embodiments, the controller 250 may obtain the sound signal through a sound collecting component after launching the application, and extract voiceprint information from the sound signal. Then the voiceprint information is compared with a preset test voiceprint. If the voiceprint information is the same as the preset test voiceprint, the sound signal is marked as the test audio signal; and if the voiceprint information is different from the preset test voiceprint, the display 275 is controlled to display a prompt interface.

For example, when the test audio signal is set as the voice of the content "Hi! Xiaoju", after the microphone detects the sound signal, the voiceprint information in the sound signal may be extracted, whether the current voiceprint information is the same as the voiceprint information of "Hi! Xiaoju" is determined, and after it is determined that the voiceprint information is the same, the subsequent steps are performed.

Obviously, the mode of utilizing the intelligent terminal to output the sound can cause the output sound have a specific waveform or loudness, which makes its corresponding audio signal have a unique sound characteristic, so it is convenient for a subsequent comparative analysis of the audio signal, and the impact of other sounds in the environment on the analysis process is reduced.

A target azimuth is determined according to the test audio signal.

After obtaining the test audio signal input from the user, the controller 250 may analyze the test audio signal to determine the target azimuth of the user. Since the sound collector 231 includes a plurality of microphones and forms the microphone array, distances between different microphones and a sound source position are different with respect to one sound source position, and correspondingly, there is a certain propagation delay between the audio signals collected from different microphones. The controller 250 may determine the general azimuth of the user during the user's voice interaction by analyzing the propagation delay between the at least two microphones, combining the distance between the two microphones and the propagation velocity of the sound in air.

The time delay detection conducted through the plurality of microphones can position the sound emission position, that is, determine a target azimuth of an object. Since the purpose of detecting the target azimuth is to orient the lens component of the camera 232 towards the object, the target azimuth may be expressed only by a relative angle, so that the controller 250 can directly determine relative angle data after determining the target azimuth, and calculate the angle that the camera 232 needs to adjust through the relative angle data. The relative angle may refer to a relative angle between a target position and a vertical line of a plane (that is, a plane parallel to a screen of the display 275) where the camera 232 is located, or may refer to a relative angle between the target position and a lens axis of the camera 232.

Figure 19:
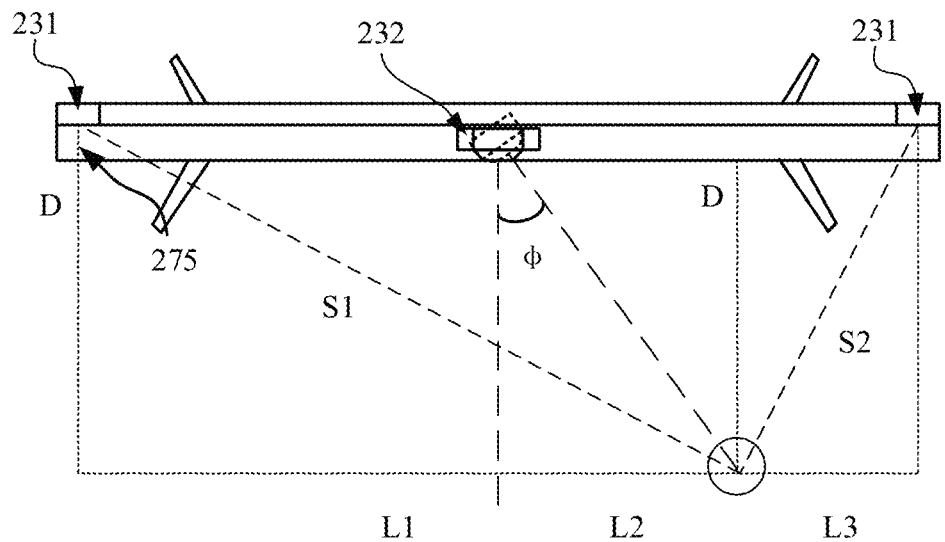
FIG. 19 shows a schematic diagram of a scenario of positioning by a sound source according to some embodiments of the present application.

For example, the sound collector 231 connected with the display apparatus 200 from outside includes the two microphones, which are respectively disposed at two sides of the display 275, and the camera 232 is disposed at a central position of a top side of the display 275. After the user inputs the voice signal at any position, the microphones on the two sides may detect the test audio signal respectively. It can be known according to a position relationship in FIG. 19 that:

Target azimuth $\Phi = \arctan(L2/D)$;

where, L2 is a horizontal distance from the user to the camera 232, and D is a vertical distance from the user to the camera 232.

According to the Pythagorean theorem, the following positional relation may be determined by:

$H = L1 + L2 + L3$;

$D^2 + (L1+L2)^2 = S1^2$; and $L3^2 + D^2 = S2^2$;

where, H is a display width, S1 is a distance between the user position and the microphone on the left side, S2 is a distance between the user position and the microphone on the right side, and $S2 = vt$; $S1 = v(t+\Delta t)$, where v is a propagation velocity of the sound in the air, t is time taken for the sound to arrive at the microphone on the right side, and $\Delta t$ is a time difference between the microphone on the left side and the microphone on the right side to obtain the test audio signal.

In all the above formulas, the display width H, the propagation velocity v and the obtaining time difference $\Delta t$ are known, so L2/D may be solved through the above position relationship, and then the target azimuth $\Phi$ may be determined.

It may be seen that in the present embodiments, the controller 250 may extract the time difference of the test audio signal by obtaining the test audio signals collected by the at least two microphones, so as to calculate the target azimuth according to the obtained time difference and mounting position data of the microphones and the camera. In order to obtain the more accurate target azimuth, the position relationship may further be determined in the horizontal direction and the vertical direction respectively, so as to calculate a horizontal deflection angle and a vertical deflection angle of the user position relative to the camera position. For example, the quantity of the microphones may be increased, or the microphones are disposed at different heights to determine the position relationship in the vertical direction so as to calculate the vertical deflection angle.

It should be noted that the more microphones there are, the more accurately the user azimuth can be positioned, and a delay numerical value between the audio signals received by the different microphones can be detected. Therefore, in practical application, the accuracy of target azimuth detection can be improved by appropriately increasing the quantity of the microphones. At the same time, in order to increase the delay numerical value to reduce the detection error interference, the more accurate detection result may further be obtained by increasing the distance between the microphones.

The rotation angle is calculated according to the target azimuth and the current pose of the camera 232.

After it is determined that the azimuth when the user utters the sound is the target azimuth, the rotation angle of the camera 232 may be calculated, so that the camera can make the lens component orient the target azimuth according to the rotation angle. For example, as shown in FIG. 18A and FIG. 18B, the current camera 232 is in the default initial pose, the relative angle between the positioned target azimuth and the screen vertical line is deviated left by 30°, and then the rotation angle $\Phi$ is determined as 30° (+30°) to the left.

Obviously, no matter which relative angle is configured to represent the target azimuth, the rotation angle can be calculated for the camera 232 according to the conversion between the position and the current pose. For example, when the current camera 232 is in a pose of leftward rotation by 50°, the relative angle between the determined target azimuth and the screen vertical line deviate left by 30°, and then the rotation angle is determined as 20° (−20°) to the right.

It should be noted that since the purpose of detecting the user azimuth through the test audio signal is to cover the user in the reference image taken by the camera 232, in most cases, the reference image taken can contain a portrait area by controlling the rotation of the camera 232 in one direction. However, in a few cases, for example, when the current pose of the camera 232 is at an extreme pose of the maximum rotating angle in the vertical direction, the camera 232 cannot capture the user in the image by rotating along the horizontal direction.

In some embodiments, the target azimuth in a space (including a height direction) may further be determined by the plurality of microphones, and when calculating the rotation angle, the target azimuth is decomposed into two angle components in the horizontal direction and the vertical direction, thus controlling the rotation angle of the camera 232 respectively.

A rotation instruction is generated according to the rotation angle, and the rotation instruction is sent to the camera 232.

After the rotation angle is calculated, the controller 250 may package the rotation angle and generate a rotation instruction. The rotation instruction is sent to the camera 232. The motor in the camera 232 may rotate after receiving the rotation instruction, so as to drive the lens component to rotate through the rotating shaft and adjust the orientation of the lens component.

It can be seen that the display apparatus 200 may be externally connected with the camera 232 and the sound collector 231 through an interface component, and after entering the application that requires portrait tracking, the test audio signal is collected through the plurality of microphones in the sound collector 231, and the target azimuth of the user is determined, so as to control the camera 232 to rotate to make the lens component orient the azimuth of the user, then adjust a shooting direction of the camera 232 to face the target azimuth, so as to facilitate the collecting of the image containing the portrait of the user, so that when there is no portrait area in the current screen, adjustment may also be performed to achieve subsequent user tracking.

In order to track the user, after the camera 232 completes rotation, the controller 250 may further identify the position of the portrait in the image by continuing to perform the audio-visual user positioning and tracking method and by obtaining the image, so that when the position of the portrait changes, the camera 232 is controlled to rotate to track the user position, and the portrait in the image collected by the camera 232 is always in a proper area.

In some embodiments, when the camera 232 rotates to face the target azimuth according to the rotation instruction, the controller 250 may further obtain the reference image through the camera 232, and detect a portrait pattern in the reference image; and then the user position is tracked by marking the portrait pattern and sending a tracking instruction to the camera 232 when the user moves. By tracking the user position, the user pattern may always be in a proper position in the image taken by the camera 232, such as in the middle area of the image, so that the better display effect can be obtained in the application interface when the applications involving functions such as "mirror" and "action following" are used.

In order to track the user position, in some embodiments, the controller 250 may obtain the reference image through the camera 232 according to a predetermined frequency, and detect the position of the portrait pattern in the reference image. According to the different image layouts required by the application, different preset area ranges may be set according to the application type. When the portrait pattern is within the preset area, it means that in the reference image currently collected, the portrait pattern is in an appropriate position, which can keep the shooting direction of the current camera 232 unchanged. When the portrait pattern is not within the preset area, it means that the position of the current user has a large moving distance, the position of the portrait pattern in the collected reference image is inappropriate, and the shooting direction of camera 232 needs adjustment.

Therefore, the controller 250 may generate a tracking instruction according to the position of the portrait pattern, and send the tracking instruction to the camera 232 to control the camera 232 to adjust the shooting direction. Obviously, after the camera 232 receives the tracking instruction, the adjusted shooting direction should be able to keep the portrait pattern be in the preset area. For example, the audio-visual user positioning and tracking method further includes: detecting the user position.

After the rotation adjustment of the camera 232 is performed, the camera 232 may take a plurality of frames of images in real time and send the images to the controller 250 of the display apparatus 200. On the one hand, the controller 250 may perform image processing according to the launched application, for example, the display 275 is controlled to display the image. On the other hand, the reference image may be analyzed by calling a detection application to determine the position of the user.

The detection of the user position may be implemented by an image processing program. That is, body information is detected by capturing the image taken by the camera 232 in real time. The body information may contain key points and a contour around the body. Position information of the key points and the body contour in the image is detected. The key points may refer to a series of points in a human body image that can represent human body characteristics, such as eyes, ears, the nose, the neck, shoulders, elbows, wrists, the waist, knee joints and ankle joints.

The key points may be determined by image identification, that is, the image corresponding to the key points may be determined by analyzing feature shapes in the picture and matching with a preset template, and the position corresponding to the image is obtained, so as to obtain the positions corresponding to all the key points. The position may be represented by pixel value from the boundary of the image. A plane rectangular coordinate system may be constructed with the upper left corner of the image as an origin and with the rightward and downward directions as positive directions according to a resolution and visual angle of the camera 232, and each pixel in the image can be represented by this rectangular coordinate system.

Figure 20:
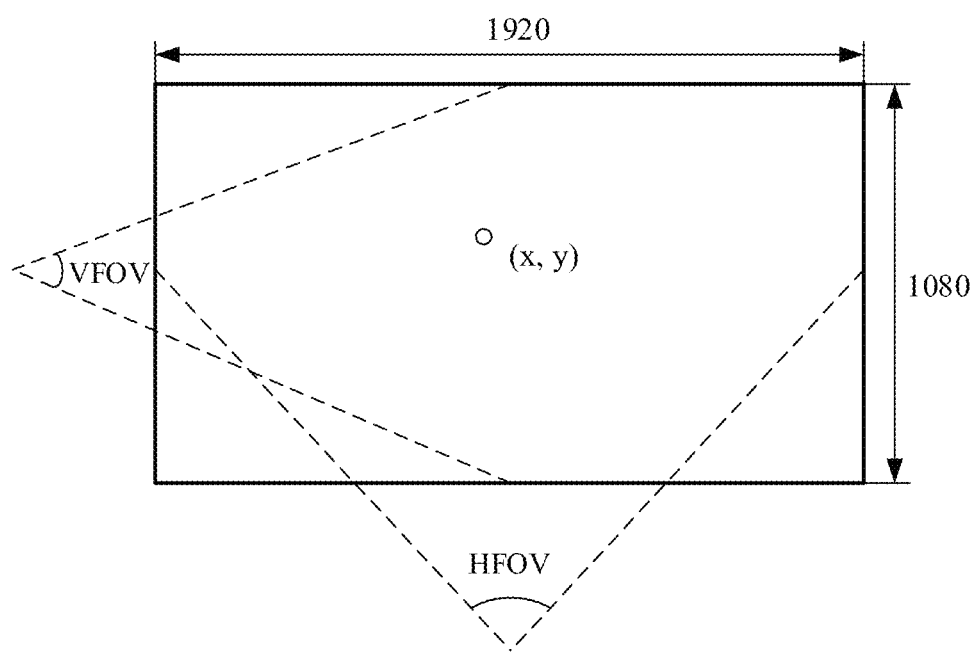
FIG. 20 shows a schematic diagram of key points according to some embodiments of the present application.

For example, as shown in FIG. 20, the visual angles of the camera in the horizontal direction and the vertical direction are denoted as HFOV and VFOV respectively, and the visual angles may be obtained according to the camera CameraInfo. A camera preview image supports 1080 P, 1920 in width, and 1080 in height, so the position of each pixel in the image may be (x, y), where a value range of x is (0, 1920), and a value range of y is (0, 1080).

Usually, in order to accurately express the position of the user, the quantity of the key points may be set to be multiple, and in one detection process, it is necessary to extract all or some of the positions of the plurality of key points, so as to determine a contour area wrapping the body. For example, the key points may include 18 points, namely 2 eye points, 2 ear points, 1 nose point, 1 neck point, 2 shoulder points, 2 elbow points, 2 wrist points, 2 waist points (or hip points), 2 knee joint points, and 2 ankle joint points. Obviously, these key points will need different identification modes according to different user orientations in the process of identification. For example, a position corresponding to the waist is identified as the waist points when the user faces the display 275, and identified as the hip points when the user backs to the display 275.

Obviously, when the position of the user or the pose changes, the position of some of key points will change. With this change, the relative position of the human body in the image collected by camera 232 will change accordingly. For example, when the human body moves left, the human body position in the image collected by camera 232 will be inclined left, which is not convenient for image analysis processing and real-time display.

Therefore, after detecting the user position, it is also necessary to compare the user position with the preset area in the reference image to determine whether the current user position is in the preset area.

In some embodiments, the user position may be represented by the central position of the body contour, and the central position of the body contour may be calculated by all detected position coordinates of the key points. For example, by obtaining the x-axis position coordinates of the key points on the horizontal left and right sides of the body contour, the central position of the body contour is calculated, that is, the x-axis coordinates of the central position $x_0=(x_1+x_2)/2$.

Since the camera 232 in the embodiments of the present application may include two left-right direction rotations and up-down direction rotations, after the x-axis coordinate of the central position is calculated, the x-axis coordinate may be judged first to determine whether the x-axis coordinate of the central position is located in a central position of the entire image. For example, when the reference image is a 1080 P image (1920, 1080), the horizontal coordinate of a center point of the reference image is 960.

After determining the central position of the portrait and the center point of the image, whether the user position is located in a preset judgment area may be determined by comparison. In order to avoid increasing processing load caused by frequent adjustment and allow partial detection error, according to the requirements of actual application conditions and a horizontal visual angle of the camera 232, an allowable coordinate interval may be preset. When the central position of the portrait is located within the allowable coordinate interval, it is determined that the current user position is in the preset area. For example, if the maximum allowable coordinate error is 300 pixels, the allowable coordinate interval is [660, 1260]. When the central position coordinates of the user obtained through detection is within the interval, it is determined that the user is in the preset area, that is, the difference between the calculated central position coordinate of the portrait and the central 960 position is not large. When the central position coordinates of the user obtained through detection are not within the interval, it is determined that the current user position is not within the preset area, that is, the difference between the calculated central position coordinate of the portrait and the central 960 position is large.

After comparing the user position with the preset area in the reference image, whether to perform object tracking may be determined according to a comparison result. If the current user position is not within the preset area, the camera 232 is controlled to rotate, so that a user imaging position is located in the middle area of the picture. If the current user position is within the preset area, it is not necessary to control the rotation of camera 232, and only the camera orientation needs to be maintained.

When the current user position is not within the preset area, in order to control the camera 232 to rotate, the controller 250 may calculate rotation angle amount according to the user position and generate a control instruction according to the rotation angle amount so as to control the camera 232 to rotate.

Specifically, after determining that the current user position is not within the preset area, the controller 250 may first calculate a distance between the central position of the portrait area and the central point of the image area; then calculate the rotation angle according to the calculated distance and in combination with the maximum visual angle of the lens component of the camera 232 and an image size; and finally, send the calculated rotation angle to the camera 232 in the form of a control instruction, so that the motor in the camera 232 drives each rotating shaft to rotate, thus adjusting the orientation of the lens component.

Figure 21:
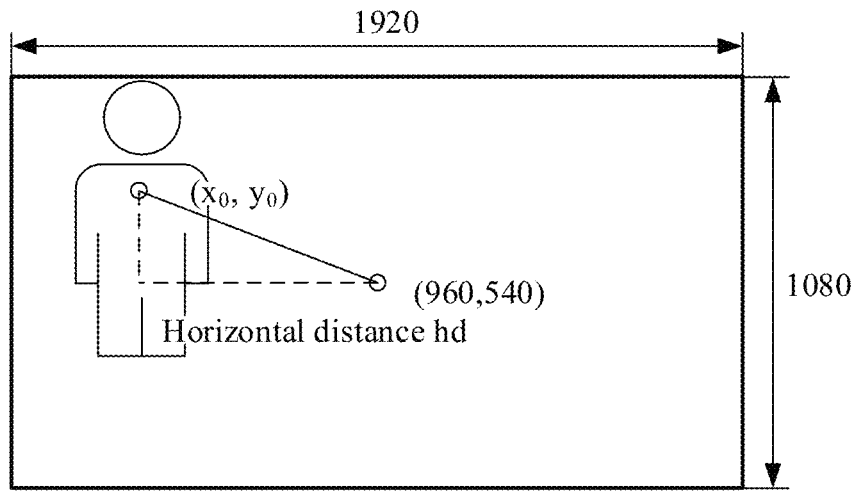
FIG. 21 shows a schematic diagram of a portrait center and an image center according to some embodiments of the present application.
Figure 22:
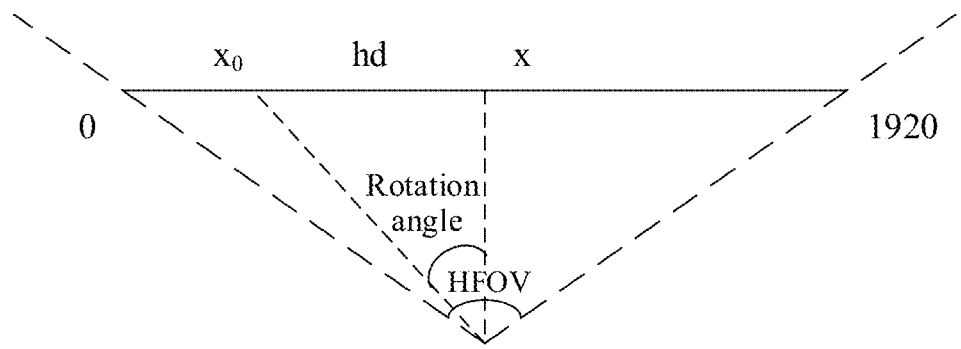
FIG. 22 shows a schematic diagram of a geometric relationship in a process of calculating a rotation angle according to some embodiments of the present application.

For example, as shown in FIG. 21 and FIG. 22, a preview resolution of the camera 232 is 1920×1080, and a horizontal width of the image is: imgWidth=1920; an image horizontal center position coordinate x=960; the central position coordinate of the portrait area is ($x_0$, $y_0$), and the horizontal central position coordinate is $x_0$; the horizontal visual angle is hfov; and the distance between the center of the portrait area and the center of the image area: hd=x−$x_0$, and then the rotation angle of the camera 232 in the horizontal direction may be calculated according to the following formula:

$$\theta = \arctan\left(\frac{2|x - x_0| \times \tan(hfov)}{imgWidth}\right).$$

Through the above formula, the angle that the camera 232 needs to adjust may be calculated. The controller 250 compares the coordinate numerical values of the central position of the portrait area with that of the central point of the image area, determines the azimuth of the central position of the portrait area relative to the central point of the image area, and thus determines the rotation direction of the camera 232. That is, if the central horizontal position of the portrait area is larger than the image center, the camera 232 rotates right; otherwise, the camera 232 rotates left. In the embodiments of the present application, the camera 232 may adopt a rear camera mode, so that a screen display image and the image taken by the camera are in a left-right mirror relationship, that is, the horizontal angle rotation is heterochiral.

After determining the rotation angle and direction, the controller 250 may package rotation angle and direction data, generate a control instruction, and send the control instruction to the camera 232. The motor in the camera 232 may rotate after receiving the control instruction, so as to drive the lens component to rotate through the rotating shaft and adjust the orientation of the lens component.

It should be noted that in the above embodiments, the coordinates in the horizontal direction are taken as an example for determination and adjustment. In practical application, the lens component may further be adjusted in the same way by comparing the vertical direction difference between the central position of the portrait area and the central point position of the image area. The specific adjustment method is similar to that of the horizontal direction. That is, after determining that the current user position is not within the preset area, the controller 250 may first calculate a vertical distance between the central position of the portrait area and the central point of the image area; then calculate the rotation angle according to the calculated vertical distance and combined with the maximum visual angle of the lens component of the camera 232 in the vertical direction and the image size; and finally, send the calculated rotation angle to the camera 232 in the form of the control instruction, so that the motor in the camera 232 drives the second rotating shaft to rotate, thus adjusting the orientation of the lens component.

However, in practical application, due to the influence of the user pose and different demands in different applications, using the central position in a user position determination in some scenarios cannot achieve good presentation, detection and tracking effects. Therefore, in some embodiments, controlling the camera 232 to rotate so that the user imaging position is located in the middle area of the picture may further be performed according to the following steps.

A first identification point is detected in the reference image.

The first identification point is one or more of the identified key points, which is configured to represent some body parts of the user. For example, the first identification point may be the 2 eye points (or the 2 ear points) for indicating the head position of the user. By matching an area corresponding to the eye pattern (or the ear pattern) in the reference image, whether the current image contains the first identification point is detected, that is, whether the current image contains the eye points (or the ear points).

If the reference image does not contain the first identification point, a second identification point is detected in the reference image.

The second identification point is a key point with a certain distance from the first identification point and having a relative position relationship with the first identification point. For example, the second identification point may be the chest points. Since the chest point is located below the eye points in a normal state, and a distance between the chest point and the eye points is 20 cm to 30 cm, the direction for adjustment may be determined by detecting the chest points.

If the second identification point is detected in the reference image, the rotation direction is determined according to a positional relationship between the second identification point and the first identification point.

For example, when the first identification point, i.e. the eye points, is not detected in the reference image but the second identification point, namely the chest point, is detected, it is determined that the head image of the user cannot be fully displayed in the current reference image, and the camera 232 needs to be lifted up to make the head of the portrait enter the preset area of the image.

Obviously, in practical application, according to the different relative azimuth of the second identification point and the first identification point, when the first identification point is not detected in the reference image but the second identification point is detected, the determined rotation direction is also different. For example, when the first identification point is the waist point and the second identification point is the chest point, and when the waist point is not detected but the chest point is detected, it means that the image taken is too close to the upper part of the portrait. Therefore, the lower part of the portrait may enter the preset area of the image by reducing the shooting angle.

The camera 232 is controlled to rotate according to the rotation direction and a preset adjustment step, so that the portrait is located in the image preset area.

For example, when the eye/ear and other key points (the first identification point) are not detected but the shoulder and other key points (the second identification point) are detected, the camera 232 may be lifted up to adjust the position of the first identification point by 100 pixels each time until the first identification point is at a 1/7-1/5 position of the whole image.

If the reference image contains the first identification point, the relative position of the first identification point in the image area is obtained.

Figure 23A:
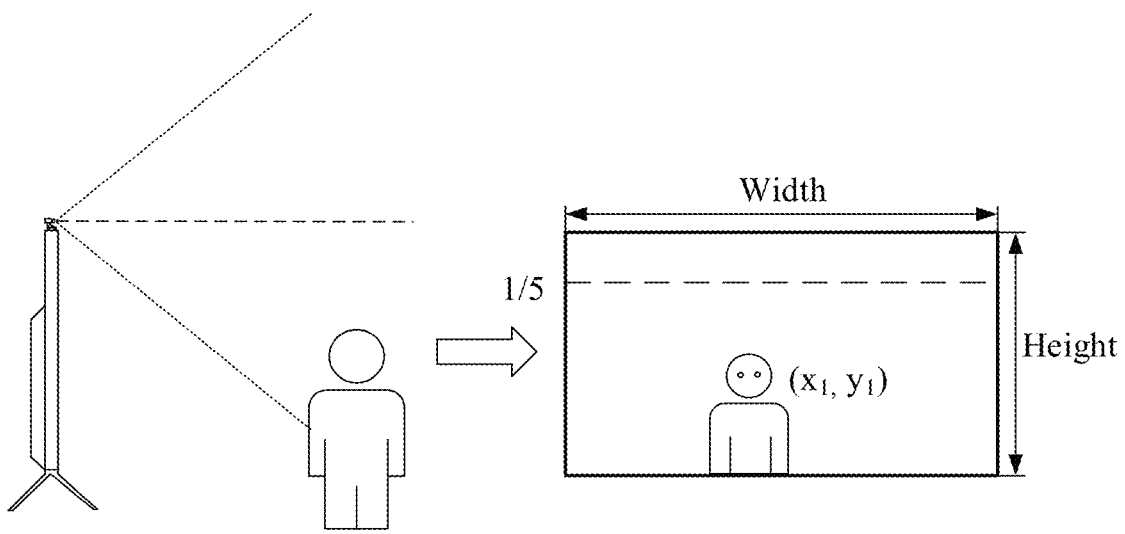
FIG. 23A shows a schematic diagram of an initial state of a process of adjusting a rotation angle according to some embodiments of the present application.

Through image identification in the reference image, if the first identification point is detected, the position of the first identification point may be further extracted, so as to determine the position of the first identification point relative to the position in the entire image area. For example, as shown in FIG. 23A, after obtaining the reference image, if the eye points are identified, that is, it is determined that the first identification point is detected, the current coordinates P $(x_1, y_1)$ of the eye points may be obtained. An x-axis coordinate value and/or a y-axis coordinate value in the current coordinates are compared with the overall width imgWidth and/or height imgHeight of the image to determine the position of the first identification point relative to the image area.

The positions of the first identification point relative to the image area in the horizontal and vertical directions may be determined in the horizontal and vertical directions. That is, in the horizontal direction, the position of the first identification point relative to the image area is $x_1$/imgWidth; and in the vertical direction, the position of the first identification point relative to the image area is $y_1$/imgHeight.

After obtaining the position of the first identification point relative to the image area, an interval of the position corresponding to the first identification point may further be determined, and different adjustment modes are determined according to the different intervals.

Figure 23B:
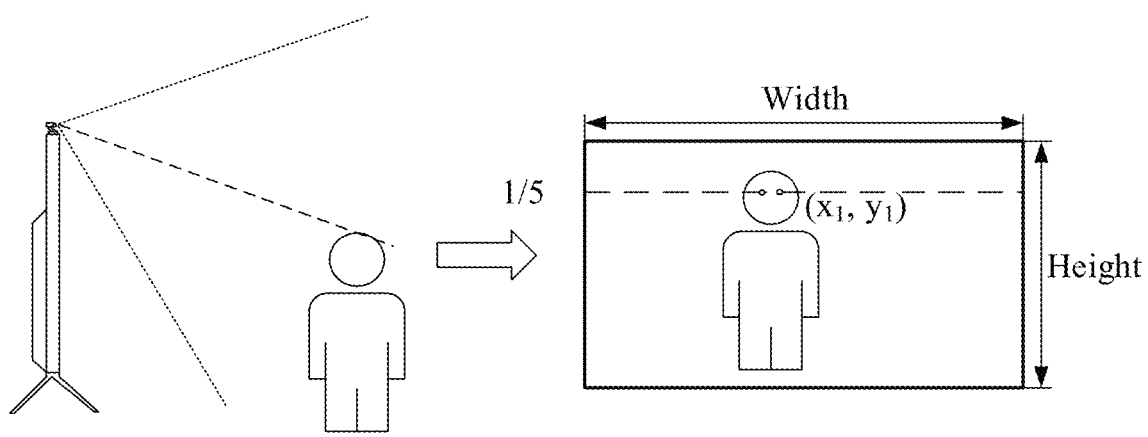
FIG. 23B shows a schematic diagram of a result of a process of adjusting a rotation angle according to some embodiments of the present application.

For example, as shown in FIG. 23A, by detecting the position of the first identification point relative to the image area in the vertical direction, it is detected that the eyes (or ears) are below 1/5 of the image picture height. In this case, the eye position is too low, and the camera 232 needs to be adjusted down to raise the eye position to a proper area. If it is detected that the eye points are at the position of 1/5 of the image picture in the process of adjusting the camera 232 down, the downward adjustment is stopped, and the adjustment of the camera 232 is completed, as shown in FIG. 23B. When it is detected that the eye (or ear) position is below 1/7 and above 1/5 of the image picture height, it is determined that the current position of the first identification point is appropriate. Therefore, the height of the camera 232 does not need to be adjusted to prevent frequent changes of the camera caused by jitter.

The above embodiments may realize real-time control of the orientation of the camera 232 and tracking of a portrait target by combining image identification. Obviously, in practical application, the portrait target may further be tracked through sound source positioning. Therefore, in some embodiments of the present application, the portrait target may be tracked by adopting a mode of combining sound source positioning and image identification, and the portrait target is positioned more accurately.

For example, when running some fitness applications with a large movement amplitude and a fast motion, it may obtain in advance by means of statistics and other modes to determine which special time periods are likely to determine the user position, in this time period, the user position may be determined with additional information such as by obtaining the audio signal, and a combined positioning is performed according to results of image identification and audio positioning in this case, so as to improve the target tracking accuracy.

In addition, in some scenarios, there may be a plurality of portraits detected through image identification, which will affect the tracking process of the camera 232. Therefore, in some embodiments of the present application, one of the plurality of portraits may further be locked for tracking through a locking program. For example, a portrait nearest to a screen center in a certain area of the screen center may be searched as the best face information (1/3 area of the size of the center screen, with the largest number of occurrences), so that the user information is marked and locked. If no face information is detected, it means that an error of sound information is large, and the user closest to the screen is locked.

After locking one of the portraits, the adjustment of the camera 232 may be affected only by the position of the locked user. That is, the movement of other people in the image taken by the camera 232 will not adjust the camera 232, and the camera 232 still remains in a stationary state. Only after the movement of the user in the locked state is detected by image detection, the camera 232 is driven to follow the locked user to rotate.

It can be seen that the display apparatus 200 may obtain the reference image through the camera 232, detect the portrait pattern in the reference image, so as to mark the portrait pattern, and when the user moves, send a tracking instruction to the camera to track the user position, thereby realizing an effect that the camera 232 follows the user to move. By tracking the user position, the portrait pattern in the image taken by the camera 232 may always be in a proper, which is convenient for the application to display, call, analyze and process.

In some embodiments, in the step of marking the portrait pattern, if the reference image includes a plurality of portrait patterns, a portrait pattern located in a central area of the reference image is searched; if the central area of the reference image contains the portrait pattern, the portrait pattern in the central area of the image is marked; and if the central area of the reference image does not contain the portrait pattern, the portrait pattern with the largest area in the reference image is marked.

For example, the controller 250 may inquire about the state of the camera 232 in real time. If the camera 232 finishes rotating according to the test audio signal, an AI image detection algorithm is started. The face information from the central position of the screen is searched in a certain area of the screen center, and the user information is marked and locked. If no face information is detected, it means that the error of the sound information is large, and the user closest to the screen is locked.

In some embodiments, before obtaining the test audio signal input from the user, the image taken by the camera 232 may further be identified once to determine whether the current camera 232 can take a picture with a target object. If the target object is identified from the image taken, target tracking is directly performed through subsequent image processing without through sound source positioning. That is, after starting the camera 232, an initial image for identifying the target object may be obtained first, and the target object area is identified in the initial image. The identification method of the portrait area may be the same as that of the above embodiment, that is, it is realized by identifying the key points of the object.

If the initial image contains the target object, the user position detection and subsequent steps are directly performed, and the target is tracked by image processing. If the initial image does not contain the target object, the camera 232 is adjusted to the area facing the object by obtaining the test audio signal input from the user and the subsequent steps through the sound source positioning, and then the user position detection and the subsequent steps are performed.

Figure 24A:
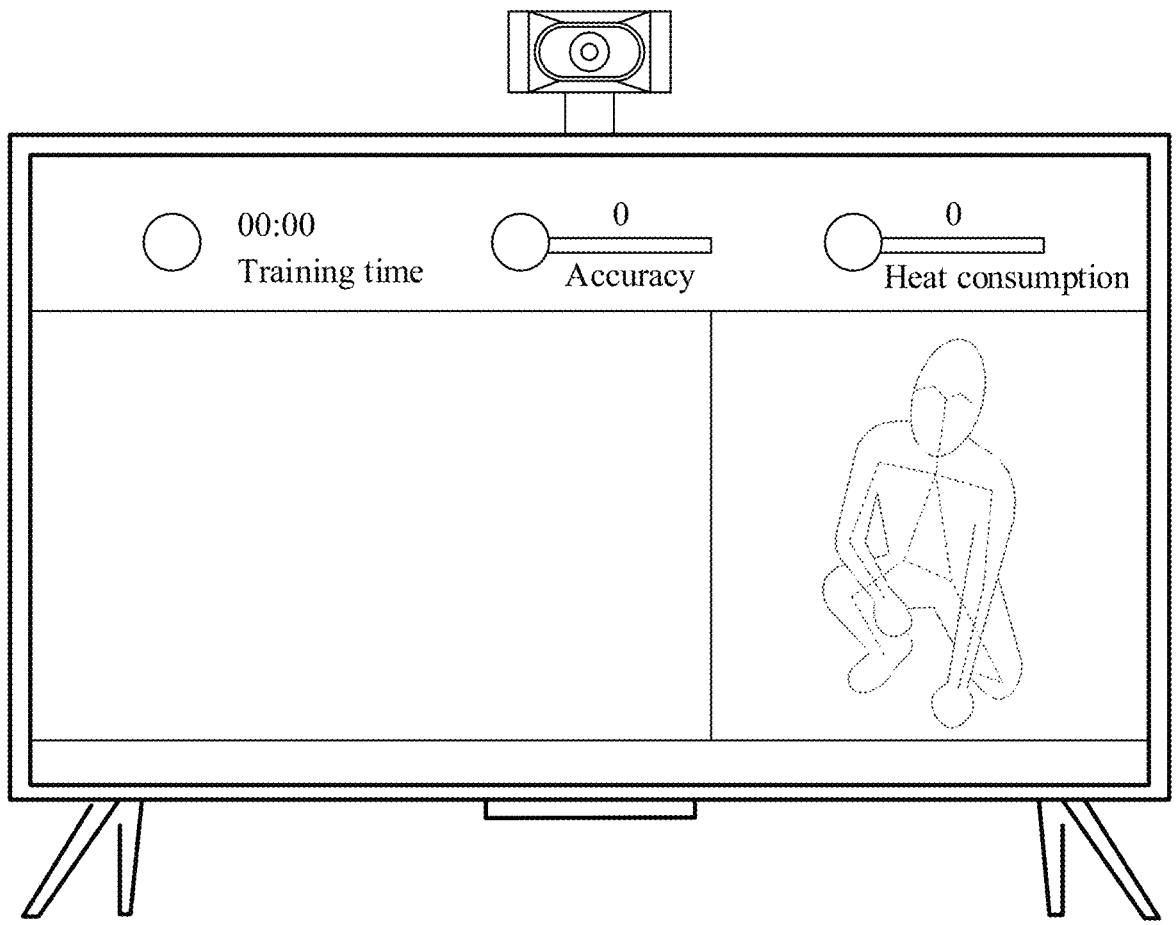
FIG. 24A shows a schematic diagram of a squatting state according to some embodiments of the present application.
Figure 24B:
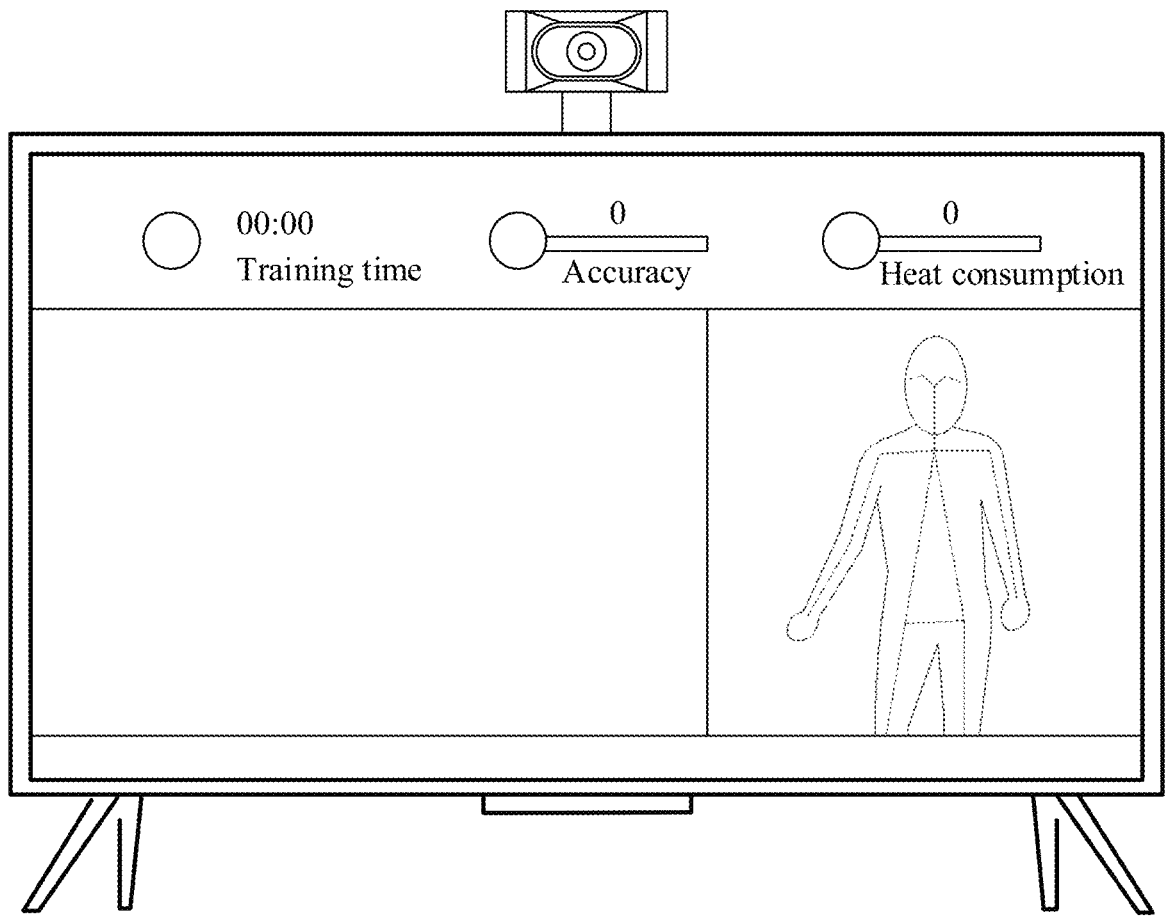
FIG. 24B shows a schematic diagram of a standing state according to some embodiments of the present application.

In order to obtain the more accurate target position determination, in some embodiments, as shown in FIG. 24A and FIG. 24B, after a plurality of key points are identified, a skeleton line schematic diagram may further be established according to the identified key points, so as to further determine the position of the target according to the skeleton line graph. Skeleton lines may be determined by connecting the plurality of key points. Shapes of the skeleton lines are also different in different user poses.

It should be noted that the shooting position of the camera may further be dynamically adjusted through the skeleton lines drawn according to the movement and change trends of the skeleton lines. For example, when it is determined that the change process of the movement state of the skeleton lines is changed from a squatting state to a standing state, the visual angle of the camera 232 may be raised, so that the portrait in the standing state can also be in a proper area in the image, that is, transiting from FIG. 24A to an effect shown in FIG. 24B. When it is determined that the change process of the movement state of the skeleton lines is changed from the standing state to the squatting state, the visual angle of the camera 232 may further be lowered, so that the portrait in the squatting state can also be in the proper area of the image, that is, transiting from FIG. 24B to an effect shown in FIG. 24A.

Figure 25A:
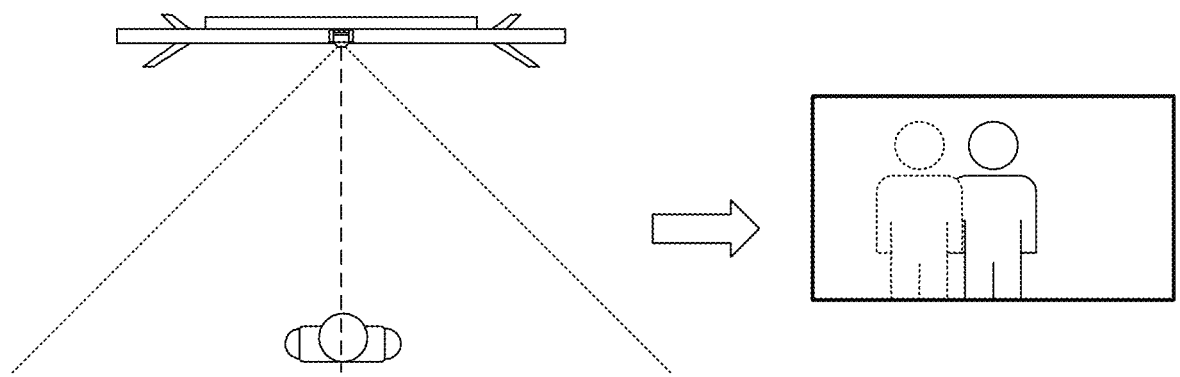
FIG. 25A shows a schematic diagram of a display effect of an initial state of a virtual portrait according to some embodiments of the present application.

The above embodiments take the position of the target in the image center as an example to illustrate the target tracking by the camera 232. It should be understood that according to needs, the position of the target may be located in other areas outside the central area in the image, which is expected to be taken. For example, as shown in FIG. 25A, for the applications involving following movements such as workout applications, the display apparatus 200 may render a virtual trainer image according to the video taken by the camera 232, so that the scenario audio and video viewed by the user through the display apparatus 200 include the user portrait and the virtual trainer portrait. In this case, for rendering with the scenario, it is required that the portrait taken by the camera 232 is located on one side of the image and the other side is configured to render the virtual trainer image.

Figure 25B:
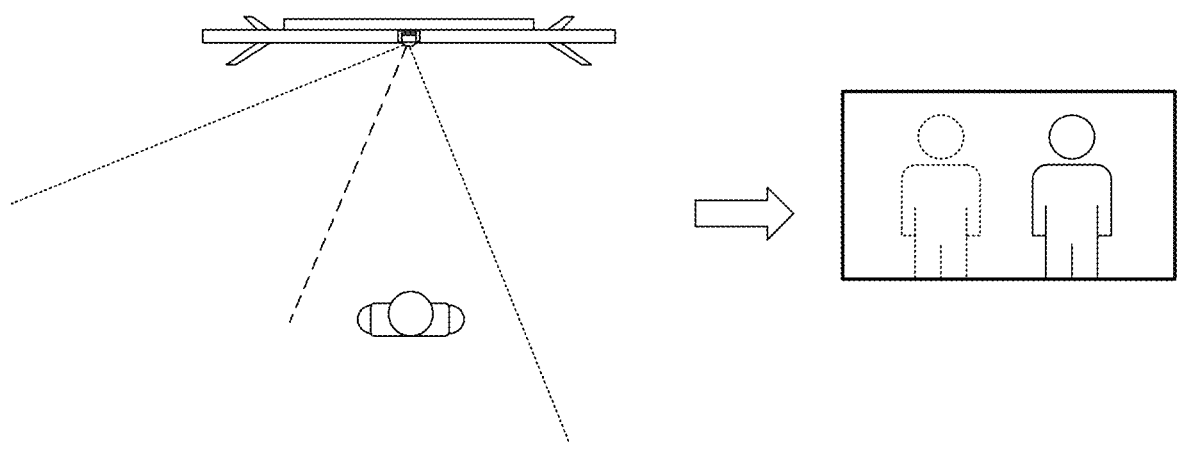
FIG. 25B shows a schematic diagram of a display effect of a virtual portrait after adjustment according to some embodiments of the present application.

For example, as shown in FIG. 25A and FIG. 25B, when it is determined through the reference image that the current portrait position is located in the image central area, it needs to send the rotation command to the camera 232 to rotate the camera 232, so that the portrait is located in the right side area of the image.

It can be known that, compared with a user tracking mode only through image processing and sound source positioning, the audio-visual user positioning and tracking method according to the embodiments of the present application can remedy deficiencies since the sound source positioning accuracy is low and the specific position of the user cannot be effectively located, and image processing has poor sense of spatial perception and only the shooting area aligned with the camera 232 can be positioned. The audio-visual user positioning and tracking method makes comprehensive use of sound source positioning and camera 232 image analysis, and uses the advantages of the high spatial perception ability of sound source positioning to first confirm the approximate position of the user and drive the camera 232 to face the sound source direction. Meanwhile, the advantage such as the high accuracy of the camera 232 image analysis is utilized to perform user detection on the image to determine the specific position, and the camera is driven to be finely tuned to achieve precise positioning, so that the user taken by the camera 232 can be focused and presented in the image.

Based on the above audio-visual user positioning and tracking method, in some embodiments, the present application further provides a display apparatus 200, including a display 275, an interface component, and a controller 250.

The display 275 is configured to display a user interface, the interface component is configured to connect with a camera 232 and a sound collector 231, and the camera 232 can rotate a shooting angle, and is configured to capture an image. The sound collector 231 includes a microphone array including a plurality of microphones, which is configured to collect audio signals.

The controller 250 is configured to obtain a test audio signal input from a user and position a target azimuth based on the test audio signal. The target azimuth is calculated according to a time difference of the test audio signal collected by a sound collecting component, so that a rotation command is sent to the camera to adjust a photographing direction of the camera to face the target azimuth.

In the above embodiments, the above audio-visual user positioning and tracking method may be realized by connecting with the camera 232 and the sound collector 231 via the interface component, and combining with the display apparatus 200. In some embodiments, the camera 232 and the sound collector 231 may further be directly built in the display apparatus 200, that is, the display apparatus 200 includes the display 275, the camera 232, the sound collector 231 and the controller 250. The camera 232 and the sound collector 231 may be directly connected with the controller 250, so as to obtain the test audio signal directly through the sound collector 231, and directly control the camera 232 to rotate, thereby realizing the above audio-visual user positioning and tracking method.

In order to facilitate an explanation, the above has discussed with reference to the specific embodiments. However, the above exemplary discussion does not intend to exhaust or limit the implementations to the above disclosed form. Various modifications and variations may be obtained according to the above teaching. Selection and description of the above implementation are for better explaining the principle and actual application, so that those skilled in the art better use the implementations.

What is claimed is:

1. A display apparatus, comprising:
   a display, configured for presenting one or more images and one or more user interfaces, wherein the one or more images comprise images obtained from broadcast system or network;
   an interface component, connected with a camera and a sound collector, wherein the camera is configured for capturing images and able to rotate a shooting angle, and the sound collector comprises a microphone array including a plurality of microphones and is configured for collecting one or more audio signals; and
   a controller, connected with the display and the interface component, and configured for:
   starting shooting at least one image through the camera;
   in response to the at least one image not comprising a portrait of a user, starting obtaining a first test audio signal input from the user through the sound collector;
   in response to the first test audio signal, determining a target azimuth corresponding to the user, wherein the target azimuth is calculated according to a time difference of the test audio signal by obtaining at least two test audio signals collected by at least two microphones among the microphone array;
   generating a rotation instruction for the camera according to the target azimuth of the user;
   sending the rotation instruction to the camera to adjust a shooting direction of the camera to the target azimuth; and
   controlling the camera to shoot one or more reference images until a reference image comprises a portrait pattern of the user, stopping obtaining a subsequent test audio signal input following the first test audio signal from the user, and generating a tracking instruction according to a position of the portrait pattern in the reference image, wherein the position of the portrait pattern in the reference image is determined according to a skeleton line graph created based on one or more identified key points of the portrait of the user.

2. The display apparatus according to claim 1, wherein the controller is further configured for:
   detecting the portrait pattern in the reference image and determining a preset area in the reference image, wherein the preset area has a maximum allowable coordinate range based on a central position of the portrait of the user;
   in response to the portrait pattern being within the preset area, maintaining the shooting direction of the camera; and
   in response to the portrait pattern being not within the preset area, adjusting the shooting direction of the camera in response to the tracking instruction.

3. The display apparatus according to claim 2, wherein the controller is further configured for:
   identifying at least one key point of the portrait of the user in the reference image and creating the skeleton line graph based on the at least one identified key point; and
   determining a portrait position according to the skeleton line graph, marking the portrait position, sending the tracking instruction to the camera while the user is moving, and tracking a user position by adjusting the shooting direction of the camera according to the portrait position.

4. The display apparatus according to claim 3, wherein the controller is further configured for:
   obtaining the reference image according to a preset frequency through the camera;
   detecting the portrait position of the portrait pattern in the reference image;
   in response to the portrait pattern being not within the preset area, generating the tracking instruction according to the portrait position of the portrait pattern, wherein the tracking instruction comprises a rotation direction of the camera and a rotation angle of the camera; and
   sending the tracking instruction to the camera.

5. The display apparatus according to claim 2, wherein the controller is further configured for:
   in response to the reference image comprising a plurality of portrait patterns of users, seeking a first portrait pattern located in a central area of the reference image from the plurality of portrait patterns;
   in response to the central area of the reference image comprising the first portrait pattern, marking the first portrait pattern as a target portrait position; and
   in response to the central area of the reference image not comprising the first portrait pattern, marking a second portrait pattern occupying a maximum area among the plurality of portrait patterns as a target portrait position.

6. The display apparatus according to claim 1, wherein the controller is further configured for:
   obtaining an initial image through the camera;
   identifying a portrait pattern of the user from the initial image;
   in response to the initial image containing the portrait pattern of the user, sending the rotation instruction to the camera; and
   in response to the initial image not containing the portrait pattern of the user, obtaining a subsequent test audio signal following the first test audio signal from the user for positioning the user.

7. The display apparatus according to claim 1, wherein the controller is further configured for:
   obtaining a plurality of skeleton line graphs from a plurality of reference images with portraits of the user;
   identifying a move state of the user according the plurality of skeleton line graphs;
   calculating move change trends according to the move state of the user; and
   adjusting the shooting direction of the camera according to the move change trends.

8. The display apparatus according to claim 1, wherein the controller is further configured for:

obtaining a sound signal through the sound collector;
extracting voiceprint information from the sound signal;
comparing the voiceprint information with a preset test voiceprint;
in response to the voiceprint information being the same as the preset test voiceprint, marking the sound signal as the test audio signal; and
in response to the voiceprint information being different from the preset test voiceprint, controlling the display to present a prompt interface for indicating voice input.

9. The display apparatus according to claim 1, wherein the controller is further configured for:
obtaining the reference image and detecting a portrait position from the reference image;
comparing the portrait position with a preset area in the reference image;
in response to the portrait position being within the preset area, controlling the display to present an image shot by the camera in real time;
in response to the portrait position being not within the preset area, calculating a coordinate difference between the portrait position and a center of the preset area; and
generating the rotation instruction according to the coordinate difference and sending the rotation instruction to the camera.

10. The display apparatus according to claim 1, wherein the controller is further configured for:
inquiring about a current work state of the camera;
in response to the current work state of the camera being a rotating state, waiting for the camera to finish rotating; and
in response to the current work state of the camera being a non-rotating state, obtaining a current shooting angle of the camera.

11. A processing method for a display apparatus with a camera, comprising:
starting shooting at least one image through the camera;
in response to the at least one image not comprising a portrait of a user, starting obtaining a first test audio signal input from the user through a sound collector of the display apparatus, wherein the sound collector comprises a microphone array including a plurality of microphones;
in response to the first test audio signal, determining a target azimuth corresponding to the user, wherein the target azimuth is calculated according to a time difference of the test audio signal by obtaining at least two test audio signals collected by at least two microphones among the microphone array of the sound collector of the display apparatus;
generating a rotation instruction for the camera according to the target azimuth of the user;
sending the rotation instruction to the camera to adjust a shooting direction of the camera to the target azimuth; and
controlling the camera to shoot one or more reference images until a reference image comprises a portrait pattern of the user, stopping obtaining a subsequent test audio signal input following the first test audio signal from the user, and generating a tracking instruction according to a position of the portrait pattern in the reference image, wherein the position of the portrait pattern in the reference image is determined according to a skeleton line graph created based on one or more identified key points of the portrait of the user.

12. The processing method according to claim 11, further comprising:
detecting the portrait pattern in the reference image and determining a preset area in the reference image, wherein the preset area has a maximum allowable coordinate range based on a central position of the portrait of the user;
in response to the portrait pattern being within the preset area, maintaining the shooting direction of the camera; and
in response to the portrait pattern being not within the preset area, adjusting the shooting direction of the camera in response to the tracking instruction.

13. The processing method according to claim 12, further comprising:
identifying at least one key point of the portrait of the user in the reference image and creating the skeleton line graph based on the at least one identified key point; and
determining a portrait position according to the skeleton line graph, marking the portrait position, sending the tracking instruction to the camera while the user is moving, and tracking a user position by adjusting the shooting direction of the camera according to the portrait position.

14. The processing method according to claim 13, further comprising:
obtaining the reference image according to a preset frequency through the camera;
detecting the portrait position of the portrait pattern in the reference image;
in response to the portrait pattern being not within the preset area, generating the tracking instruction according to the portrait position of the portrait pattern, wherein the tracking instruction comprises a rotation direction of the camera and a rotation angle of the camera; and
sending the tracking instruction to the camera.

15. The processing method according to claim 12, further comprising:
in response to the reference image comprising a plurality of portrait patterns of users, seeking a first portrait pattern located in a central area of the reference image from the plurality of portrait patterns;
in response to the central area of the reference image comprising the first portrait pattern, marking the first portrait pattern as a target portrait position; and
in response to the central area of the reference image not comprising the first portrait pattern, marking a second portrait pattern occupying a maximum area among the plurality of portrait patterns as a target portrait position.

16. The processing method according to claim 11, further comprising:
obtaining an initial image through the camera;
identifying a portrait pattern of the user from the initial image;
in response to the initial image containing the portrait pattern of the user, sending the rotation instruction to the camera; and
in response to the initial image not containing the portrait pattern of the user, obtaining a subsequent test audio signal following the first test audio signal from the user for positioning the user.

17. The processing method according to claim 11, further comprising:
obtaining a plurality of skeleton line graphs from a plurality of reference images with portraits of the user;
identifying a move state of the user according the plurality of skeleton line graphs;

calculating move change trends according to the move state of the user; and adjusting the shooting direction of the camera according to the move change trends.

18. The processing method according to claim 11, further comprising:

obtaining a sound signal through the sound collector;

extracting voiceprint information from the sound signal;

comparing the voiceprint information with a preset test voiceprint;

in response to the voiceprint information being the same as the preset test voiceprint, marking the sound signal as the test audio signal; and in response to the voiceprint information being different from the preset test voiceprint, controlling the display to present a prompt interface for indicating voice input.

19. The processing method according to claim 11, further comprising:

obtaining the reference image and detecting a portrait position from the reference image;

comparing the portrait position with a preset area in the reference image;

in response to the portrait position being within the preset area, controlling the display to present an image shot by the camera in real time;

in response to the portrait position being not within the preset area, calculating a coordinate difference between the portrait position and a center of the preset area; and generating the rotation instruction according to the coordinate difference and sending the rotation instruction to the camera.

20. The processing method according to claim 11, further comprising:

inquiring about a current work state of the camera;

in response to the current work state of the camera being a rotating state, waiting for the camera to finish rotating; and in response to the current work state of the camera being a non-rotating state, obtaining a current shooting angle of the camera.

* * * * *